(12) United States Patent
Williams

(10) Patent No.: US 10,719,878 B2
(45) Date of Patent: Jul. 21, 2020

(54) SYSTEM AND METHOD FOR PROACTIVE AUTO PORTABILITY OF INDIVIDUAL RETIREMENT ACCOUNTS

(71) Applicant: RETIREMENT CLEARINGHOUSE LLC, Charlotte, NC (US)

(72) Inventor: John Spencer Williams, Lyman, SC (US)

(73) Assignee: RETIREMENT CLEARINGHOUSE LLC, Charlotte, NC (US)

(*) Notice: Subject to any disclaimer, the term of this patent is extended or adjusted under 35 U.S.C. 154(b) by 0 days.

(21) Appl. No.: 15/913,667

(22) Filed: Mar. 6, 2018

(65) Prior Publication Data

US 2018/0342016 A1 Nov. 29, 2018

Related U.S. Application Data

(63) Continuation of application No. 14/726,760, filed on Jun. 1, 2015, now abandoned, which is a continuation-in-part of application No. 13/543,239, filed on Jul. 6, 2012, now Pat. No. 10,078,870.

(60) Provisional application No. 61/586,441, filed on Jan. 13, 2012.

(51) Int. Cl.
    *G06Q 40/06* (2012.01)
    *G06F 16/2455* (2019.01)
    *G06Q 40/02* (2012.01)

(52) U.S. Cl.
    CPC ......... *G06Q 40/06* (2013.01); *G06F 16/2455* (2019.01); *G06Q 40/02* (2013.01)

(58) Field of Classification Search
    CPC ..... G06Q 40/06; G06Q 40/02; G06F 16/2455

USPC .......................................................... 705/36
See application file for complete search history.

(56) References Cited

U.S. PATENT DOCUMENTS

| | | | | |
|---|---|---|---|---|
| 6,041,313 | A | * | 3/2000 | Gilbert ................... G06Q 40/02 705/36 R |
| 2006/0080200 | A1 | * | 4/2006 | Ashton .................. G06Q 40/02 705/35 |
| 2006/0293984 | A1 | * | 12/2006 | Loch ...................... G06Q 40/00 705/35 |
| 2007/0055602 | A1 | * | 3/2007 | Mohn .................... G06Q 40/10 705/36 R |

(Continued)

OTHER PUBLICATIONS

The automatic 401(k): A simple way to strengthen retirement saving by William G. Gale, J. Mark Iwry, and Peter R. Orszag (Tax Notes, Mar. 7, 2005). (Year: 2005).*

*Primary Examiner* — Christopher Bridges
*Assistant Examiner* — Yongsik Park
(74) *Attorney, Agent, or Firm* — Finnegan, Henderson, Farabow, Garrett & Dunner LLP

(57) ABSTRACT

A method performed by one or more processing devices, via one or more networks, for the proactive, without initiation by an owner of a first retirement account, and automatic portability of the first retirement account, comprising: automatically searching databases or sending search requests to one or more record-keepers for a second retirement account owned by the owner; and sending a negative consent notification having a date to the owner of the first retirement account; wherein the negative consent notification advises the owner that unless the owner provides other instructions within a time period from the date, the first retirement account shall be rolled over, in-whole or in-part, into the second retirement account or vice versa.

11 Claims, 21 Drawing Sheets

(56) References Cited

U.S. PATENT DOCUMENTS

| | | | |
|---|---|---|---|
| 2007/0168302 A1* | 7/2007 | Giovinazzo | G06Q 40/06 705/36 R |
| 2009/0018969 A1* | 1/2009 | Ayres | G06Q 40/06 705/36 R |
| 2009/0327155 A1* | 12/2009 | Dial | G06Q 40/06 705/36 R |
| 2011/0270748 A1* | 11/2011 | Graham, III | G06Q 40/00 705/40 |

* cited by examiner

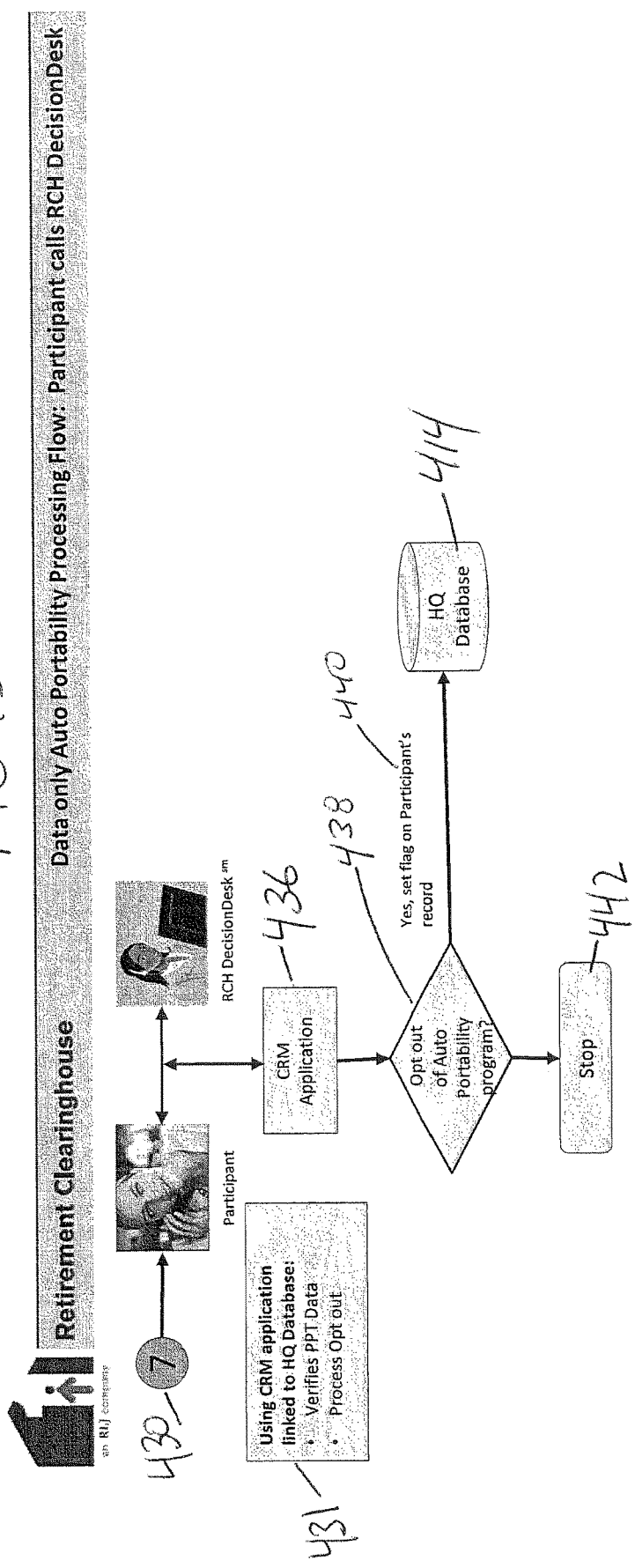

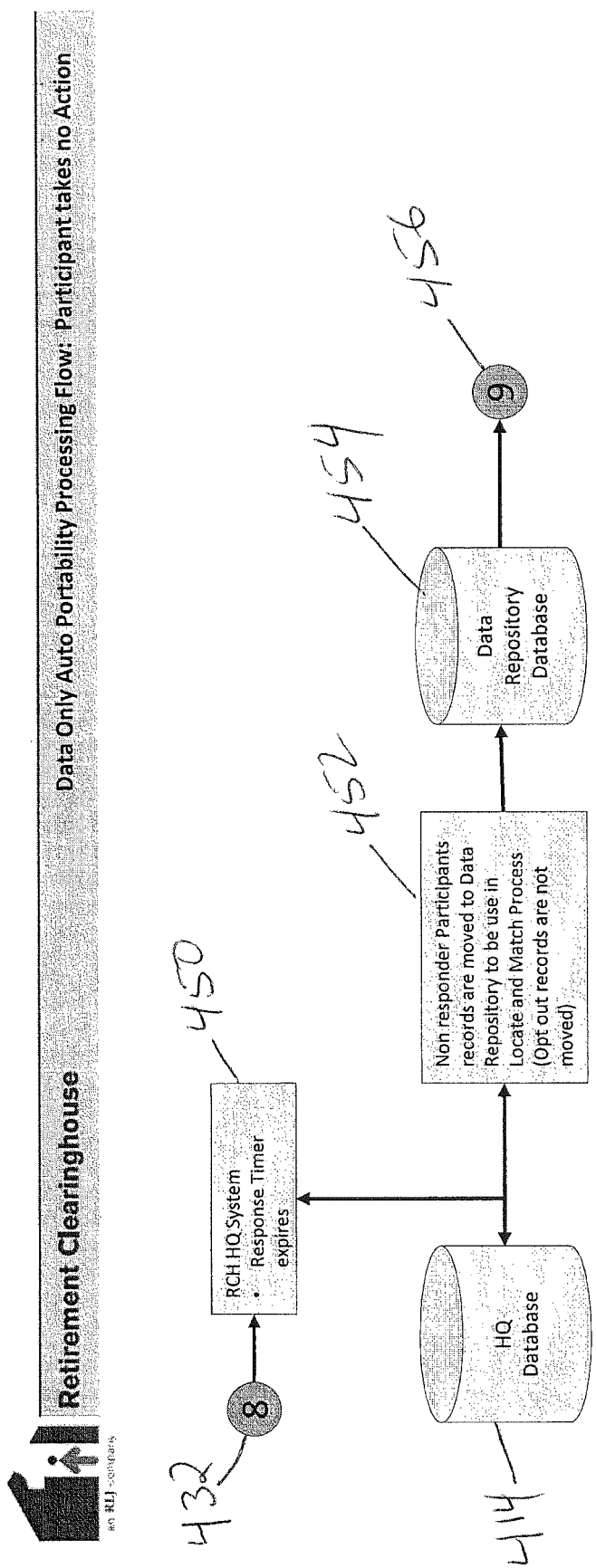

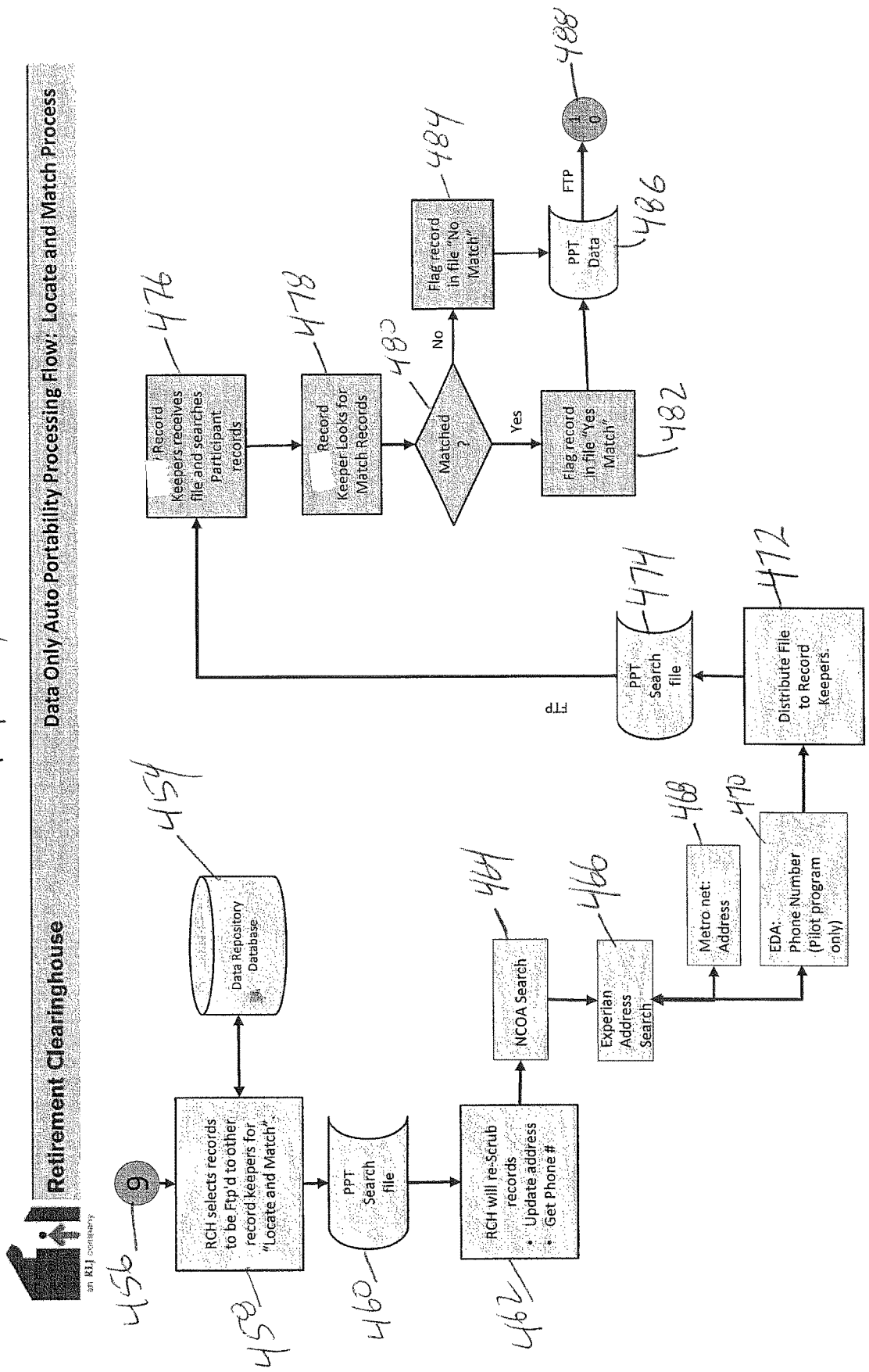

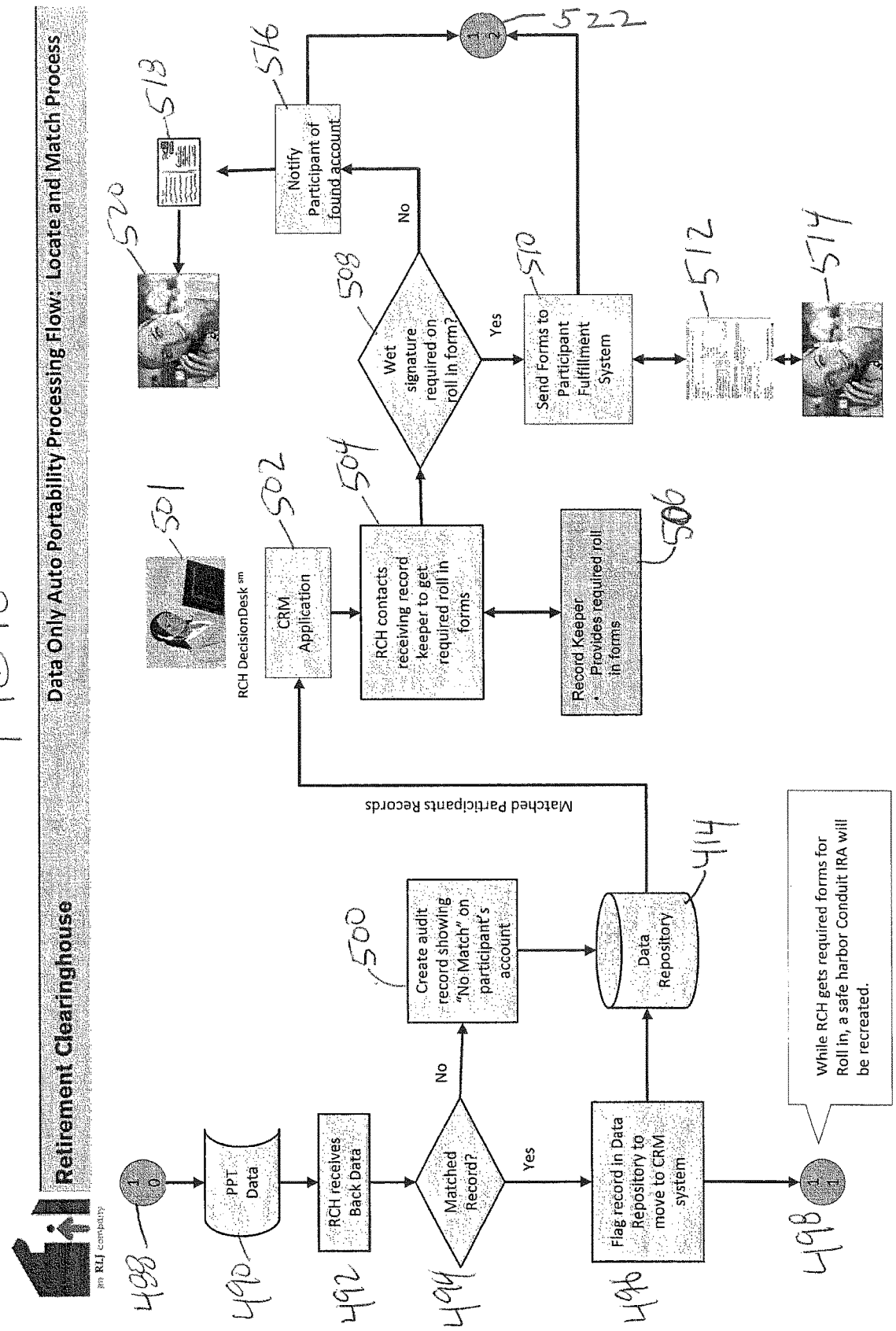

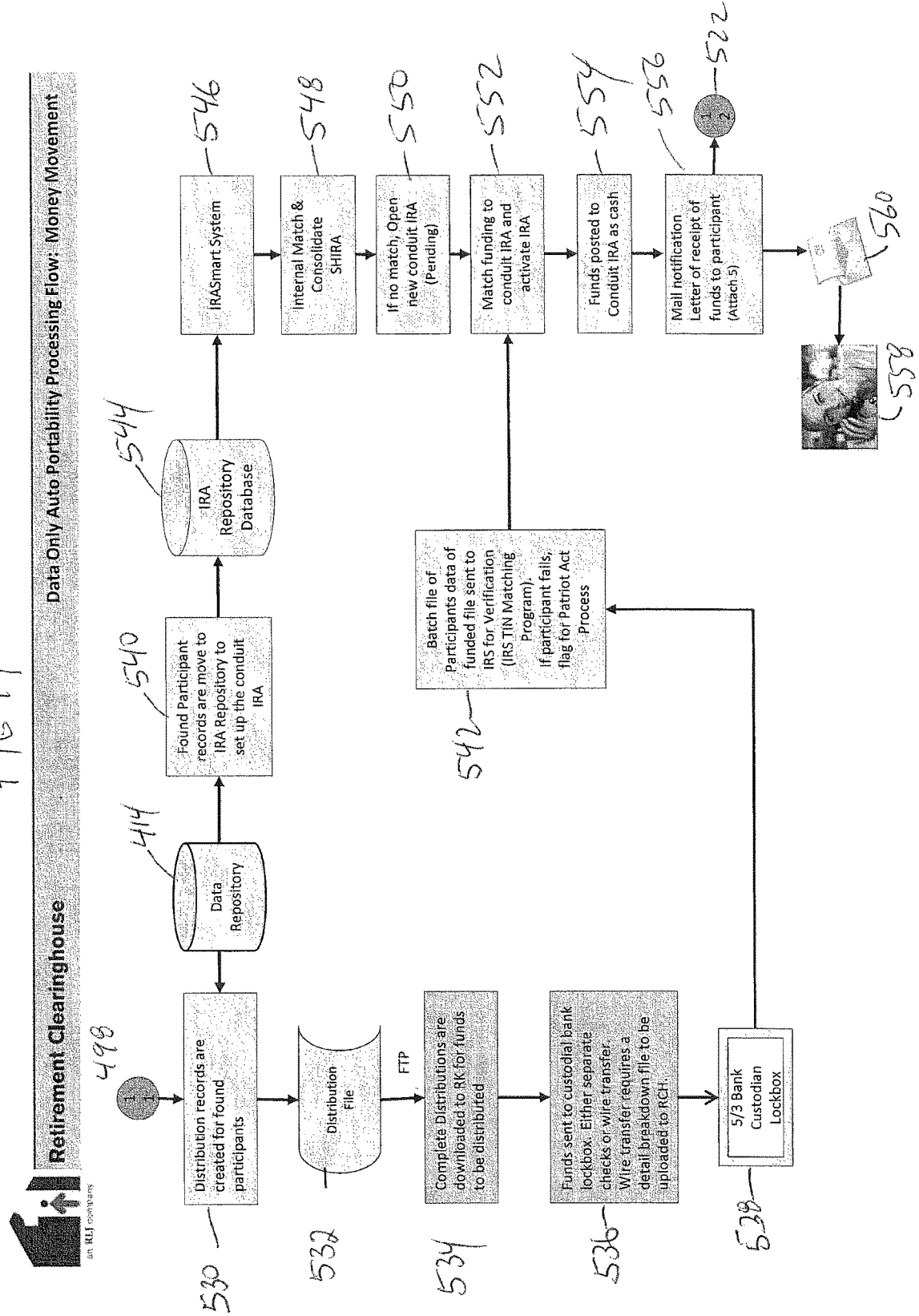

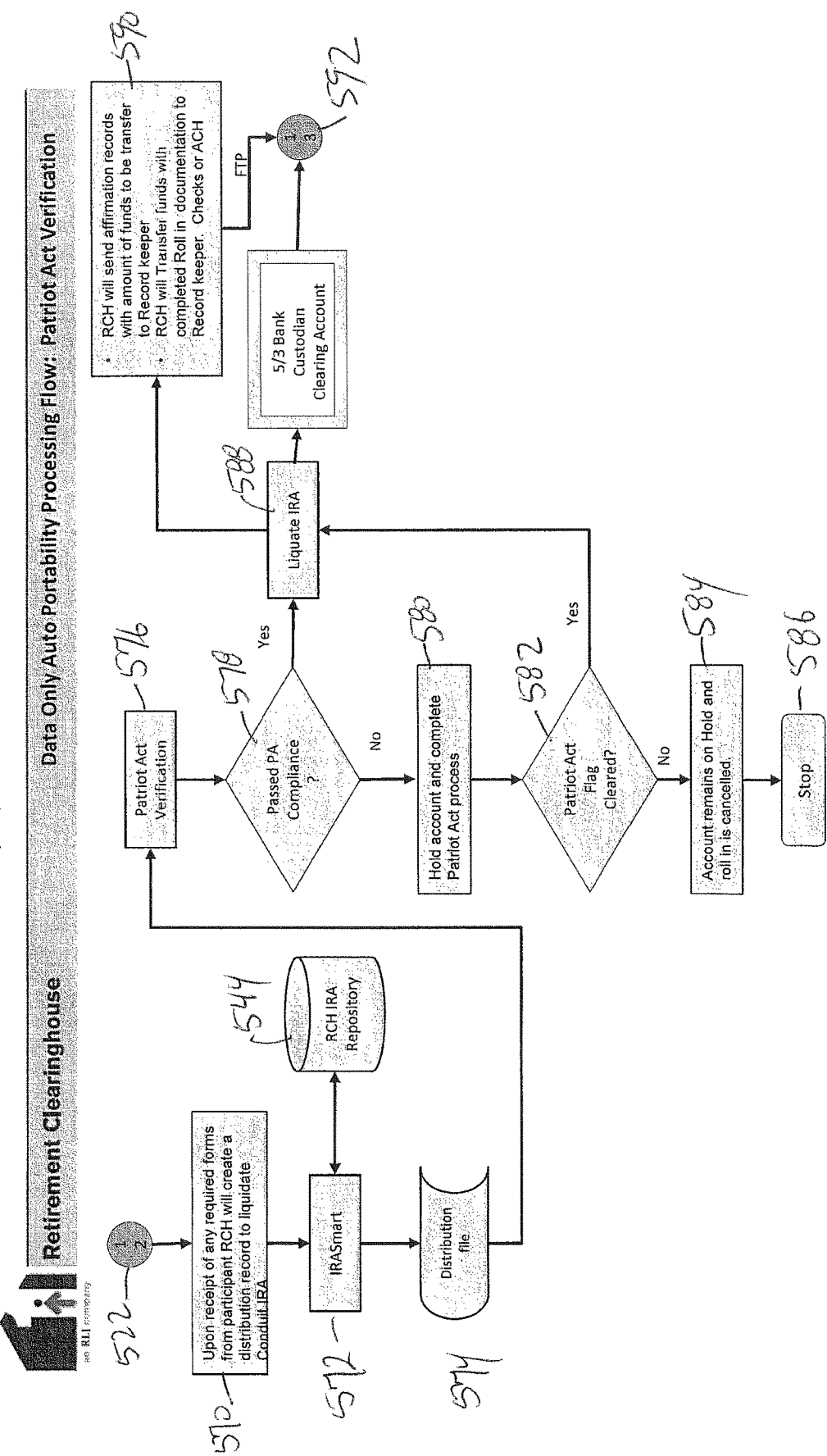

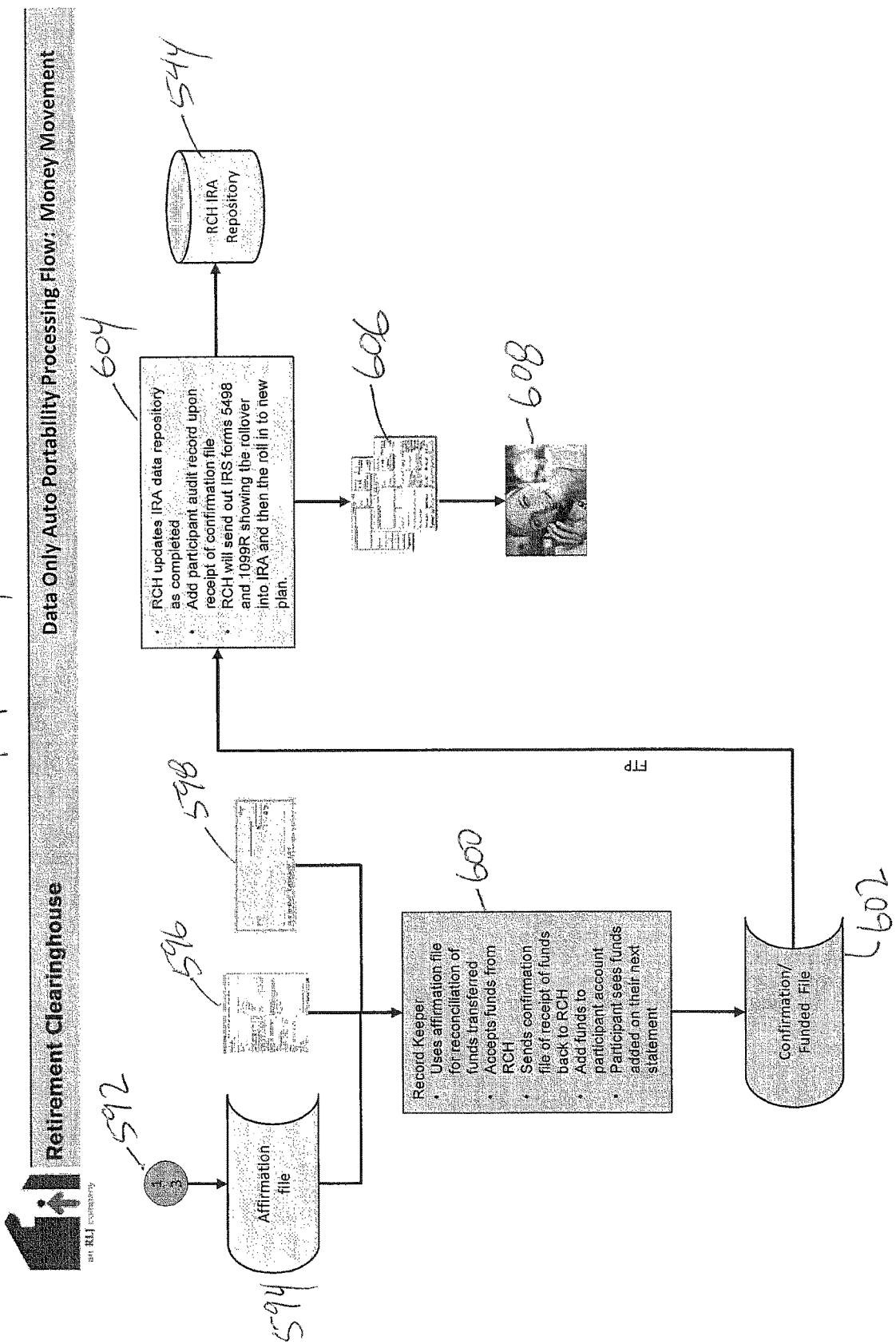

SYSTEM AND METHOD FOR PROACTIVE AUTO PORTABILITY OF INDIVIDUAL RETIREMENT ACCOUNTS

CROSS REFERENCE TO RELATED APPLICATIONS

The present application is a continuation of U.S. Application Ser. No. 14/726,760, filed Jun. 1, 2015, which is a continuation-in-part (CIP) of U.S. Application Ser. No. 13/543,239, filed Jul. 6, 2012, which claims benefit and priority from U.S. provisional application No. 61/586,441 entitled "AUTOMATIC ROLL-IN SYSTEM", filed Jan. 13, 2012, the disclosures of which are hereby incorporated herein in their entirety for all purposes.

FIELD

The present disclosure is directed to a system and method for proactive auto portability, including automation of the consolidation and/or roll-overs, of individual retirement accounts.

BACKGROUND

Many employers provide employee benefits, in the form of various benefits, plans and programs to their employees as part of their total compensation packages. These benefits may include employer administered or sponsored retirement plans, such as 401(k) plans, profit sharing programs and other similar plans.

The U.S. retirement system today suffers from a significant lack of automation in the millions of largely manual, non-standardized transactions that occur in the transfer of consumer retirement accounts between former and current employer plans and between former employer plans and individual retirement accounts. In one particularly egregious example of the retirement system's inefficiencies, the Economic Growth and Tax Relief Reconciliation Act of 2001 ("EGTRRA") amended section 401(a)(31) of the Internal Revenue Code of 1986 ("the Code") to require employers to cash out benefits greater than $1,000 and up to $5,000 and to transfer these amounts to an individual retirement account/plan ("IRA") within the meaning of section 7701(a)(31) of the Code. When EGTRRA amended section 401(a)(31) of the Code, it also amended section 404(c) of ERISA to establish a "safe harbor" which generally relieves retirement plan fiduciaries of responsibility if the automatic transfer is made in a manner consistent with the final regulations enacted by the Department of Labor (DOL) as published in regulation 2550.404a-2 of Title 29 ("the Regulation"). The safe harbor provisions require plan sponsors to enter into a written agreement with an IRA provider who will receive automatic rollover distributions ("AROs"). The written agreement must limit the form of investments and must describe the investment goals and the fees charged to the IRA and allocation of those fees to the terminated plan participant or to the plan sponsor.

The EGTRRA has contributed to the rapid growth of abandoned/orphaned accounts in the retirement system, including both Safe Harbor IRAs and abandoned/orphaned 401(k) accounts. The numbers are projected to increase each year, growing from approximately 7.5 million in 1999 to approximately 42 million in 2011 and 56 million in 2015. In many instances, a consumer will have multiple 'abandoned/orphaned' retirement accounts scattered across multiple retirement plan providers, record-keepers, or IRA providers.

The result is a highly inefficient retirement savings process for the consumer, significant administrative burdens for employer-sponsored retirement plans, an unnecessary large number of small retirement accounts administered by plan providers, and substantial "leakage" of retirement savings caused by people cashing out of low-balance retirement accounts instead of rolling those accounts into existing accounts because of the arcane, complex roll-over procedures currently in place. There are currently no automated processes in place to aid a consumer in consolidating their accounts, again, resulting in a "Hobson's Choice" between undertaking a complex and time-consuming process or simply abandoning, ignoring or cashing out of the retirement account.

The market for Mandatory Distributions/Safe Harbor IRAs (SHIRAs) is currently scattered and fractured; there is no dominant provider. Existing providers include: most of the larger defined contribution/401(k) providers, who are in the business primarily as an accommodation to their employer/plan sponsor clients where Mandatory Distributions may or may not be a profit center; and an array of independent but small scale providers, for which Mandatory Distributions are a profit center.

Thus, there exists a long-felt, unsolved need in the retirement industry for an automated roll-in system to provide an organized, orderly and economically-efficient movement of individuals' accounts between their former employer-sponsored retirement plans or IRAs and their new or existing employer's retirement plan(s).

A preferred Proactive, Auto Portability Individual Retirement Account System/Method ("PAPIRAS") includes, but is not limited to, an Automated Roll-In System/Method ("ARIS") of the present disclosure and comprises a "better mousetrap," employing a proprietary suite of component technologies and processes to achieve an unparalleled level of automation—and scalability—to the heretofore largely ignored, manual, expensive and time-consuming transaction of consolidation or rolling abandoned/orphaned retirement accounts or IRAs into an employee's retirement account under his/her current employer's qualified retirement plan. A preferred PAPIRAS of the present disclosure will routinely, securely, and automatically source, locate and/or consolidate individual retirement accounts for the ultimate benefit of the consumer, while simultaneously solving the employer-sponsored plans' administrative problems.

A preferred PAPIRAS of the present disclosure will preferably be designed to achieve critical mass by targeting for membership entities that control significant volumes of Defined Contribution retirement accounts such as large plan providers. Member record-keepers will be attracted to a preferred PAPIRAS of the present disclosure because its core value propositions are appealing from both a public policy and business perspective. Such public policy benefits include: a reduction in cash outs of retirement accounts by individuals by creating an automatic new 'path of least resistance' for transitioning employees' Mandatory Distributions. 'Do well by doing good' as American Workers' retirement account balances grow by account aggregation and "Staying Invested" so that member record-keeper firms' business will benefit due to relief from the aggravation, risk and explicit costs of providing a perpetual stream of low margin, Safe Harbor retirement account services. Assets under management (AUM) will not be significantly reduced but are likely to increase: Safe Harbor accounts will remain invested in member record-keepers' products even while the expense for administration, servicing and transfer are borne, in-whole or in-part, by PAPIRAS. Over time, the largest member record-keepers may expect their AUM to grow as an increasing number of accounts are re-cycled from former employers into existing 401(k) accounts. Member record-keepers margins will improve as low margin Safe Harbor accounts are reinvested in higher margin 401(k) investment products; member record-keepers that also provide Safe Harbor eligible investment products will receive new assets under investment from the mandatory distributions from member record-keepers that do not provide such products. A preferred PAPIRAS of the present disclosure will focus on recycling small account balances into active 401(k) accounts which will be viewed as beneficial Public Policy. It is anticipated that there will be significant interest—and support—for PAPIRAS from the several regulatory bodies that oversee the retirement industry given a mission of PAPIRAS will be to "Keep American Workers Invested in Retirement" as they transition from one employer plan to the next throughout their working lives—or into retirement. A preferred PAPIRAS of the present disclosure will also be useful to re-unite millions of American workers with their 'orphaned' retirement savings accounts by automatically "recycling" or consolidating them into their new employer's retirement plan.

BRIEF DESCRIPTION OF THE DRAWINGS

FIG. 15 is a flowchart showing additional preferred aspects of the preferred PAPIRAS of FIG. 14.

FIG. 16 is a flowchart showing yet additional preferred aspects of the preferred PAPIRAS of FIG. 14.

FIG. 17 is a flowchart showing a preferred locate and match process in the preferred PAPIRAS of FIG. 14.

FIG. 18 is a flowchart showing additional aspects of the preferred locate and match process in the preferred PAPIRAS of FIG. 14.

FIG. 19 is a flowchart showing preferred aspects of money movement in the preferred PAPIRAS of FIG. 14.

FIG. 20 is a flowchart showing preferred aspects of Patriot Act Verification procedures in the preferred PAPIRAS of FIG. 14.

FIG. 21 is a flowchart showing additional preferred aspects of money movement in the preferred PAPIRAS of FIG. 14.

SUMMARY

Figure 1:
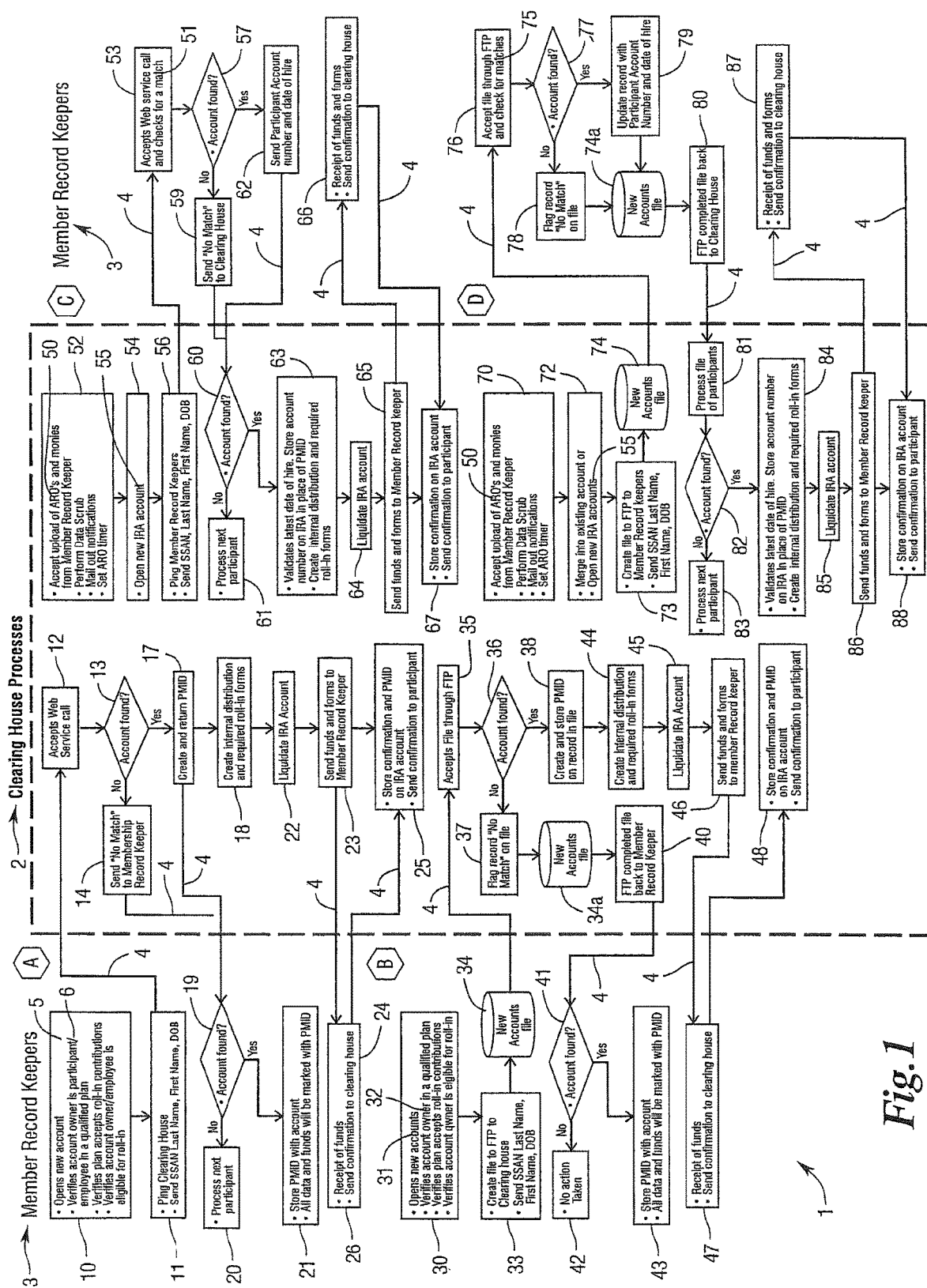
FIG. 1 is a flowchart showing an overview of various aspects of a preferred ARIS of the present disclosure.
Figure 2:
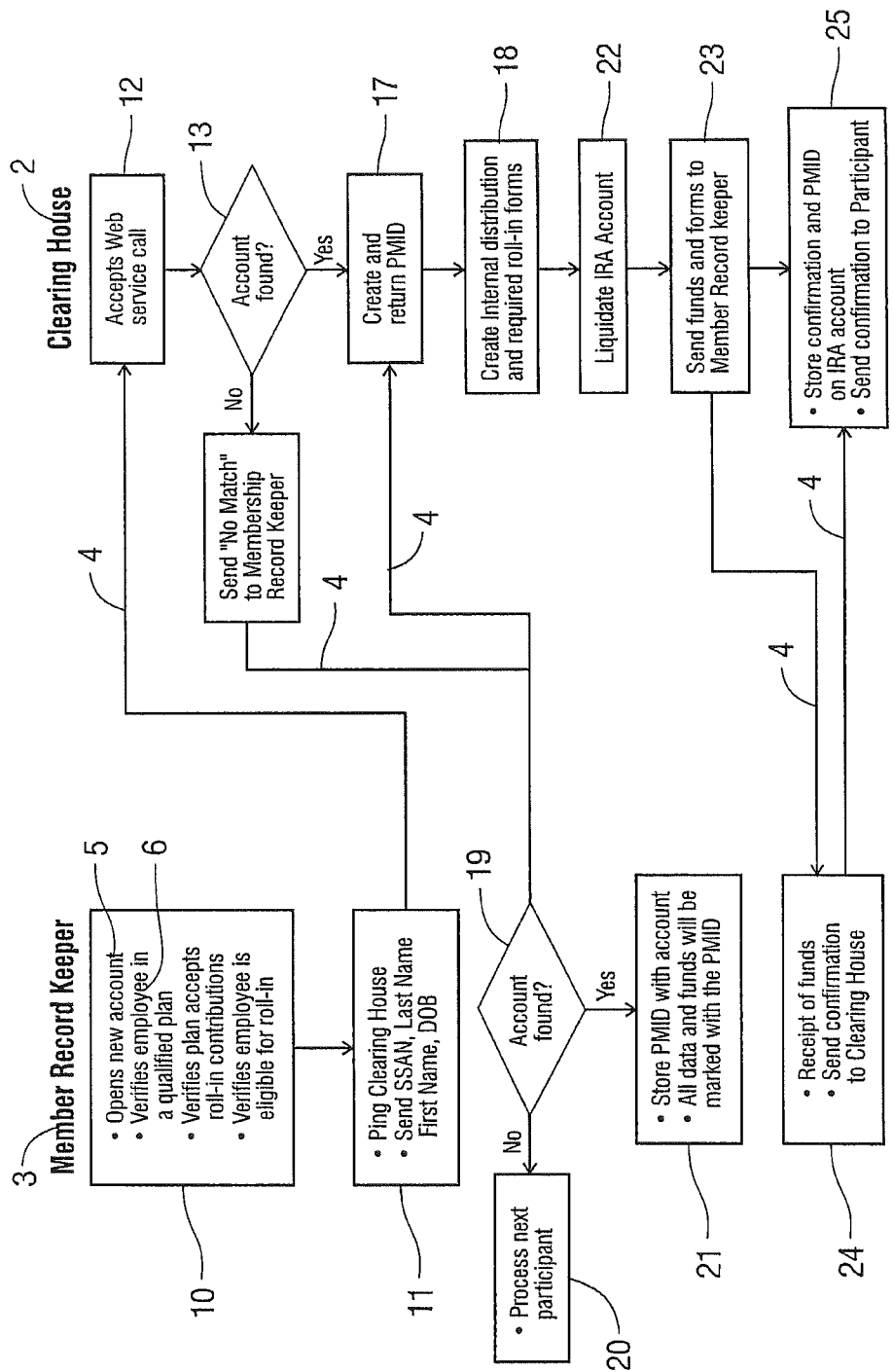
FIG. 2 is a flowchart showing a first preferred manner in which member record-keepers interact with a clearinghouse of a preferred ARTS of the present disclosure.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

In a preferred aspect, the present disclosure comprises a method performed by one or more processing devices, via one or more networks, for the proactive, without initiation by an owner of a first retirement account, and automatic portability of the first retirement account, comprising: automatically searching databases or sending search requests to one or more record-keepers for a second retirement account owned by the owner; and sending a negative consent notification having a date to the owner of the first retirement account; wherein the negative consent notification advises the owner that unless the owner provides other instructions within a time period from the date, the first retirement account shall be rolled over, in-whole or in-part, into the second retirement account or vice versa.

In another preferred aspect, the method of the present disclosure further comprises receiving an electronic data record from a first record-keeper of the one or more record-keepers for the first retirement account owned by the owner.

In yet another preferred aspect, the method of the present disclosure further comprises automatically maintaining an audit trail record in or associated with said electronic data record for the first retirement account; wherein said audit trail record contains historical information for each action taken with respect to the first retirement account and/or its associated electronic data record.

In another preferred aspect of the method of the present disclosure, the audit trail record contains historical information memorializing the date, time and/or other details about: the receiving the electronic data record from the first record-keeper for the first retirement account owned by the owner; the automatic searching databases or sending search requests to the one or more record-keepers for the second retirement account owned by the owner; the sending the dated negative consent notification to the owner of the first retirement account; wherein the negative consent notification advises the owner that unless the owner provides other instructions within a time period, the first retirement account shall be rolled over, in-whole or in-part, into the second retirement account or vice versa.

In yet another preferred aspect of the method of the present disclosure, the historical information of the audit trail record for the first retirement account is used as the sole or partial basis for determining a future action to be taken with respect to the first retirement account.

In yet another preferred aspect, the method of the present disclosure further comprises setting a timer to expire at the end of the time period from the date.

In yet another preferred aspect, the method of the present disclosure further comprises sending to a record-keeper of the second account which may be the same as the first record-keeper, data and funds of the first retirement account to be rolled over into the second account upon not receiving any other instructions from the owner within the time period.

In yet another preferred aspect, the method of the present disclosure further comprises receiving an instruction from the owner to opt-out of any rollovers between the first and second retirement accounts or an instruction to maintain the first retirement account with the first record-keeper.

In another preferred aspect, the method of the present disclosure further comprises flagging the first retirement account in a database to indicate receipt of the owner's instruction to opt-out of any rollovers between the first and second retirement accounts or to maintain the first retirement account with the first record-keeper.

In yet another preferred aspect, the method of the present disclosure further comprises receiving an instruction from the owner to issue a cash distribution from the first retirement account.

In another preferred aspect of the method of the present disclosure, first retirement account is Safe Harbor IRA (SHIRA) eligible and the second retirement account is not SHIRA-eligible.

In another preferred aspect of the method of the present disclosure, the first retirement account is not SHIRA-eligible and the second retirement account is not SHIRA-eligible.

In another preferred aspect of the method of the present disclosure, first retirement account is SHIRA-eligible and the second retirement account is not SHIRA-eligible.

In another preferred aspect of the method of the present disclosure, the first retirement account is not SHIRA-eligible and the second retirement account is not SHIRA-eligible.

In another preferred aspect of the method of the present disclosure, the negative consent notification is sent to the owner after finding the second retirement account.

In another preferred aspect of the method of the present disclosure, the negative consent notification is sent to the owner before searching for the second retirement account.

In another preferred aspect, the method of the present disclosure further comprises creating a SHIRA owned by the owner upon not finding a second retirement account owned by the owner or upon not receiving any instructions from the owner; rolling over of the first retirement account into the SHIRA owned by the owner; and sending a second notification having a date to the owner; wherein the second notification advises the owner that unless the owner provides other instructions within a time period from the date, the owner's SHIRA shall be rolled over into the second retirement account once found.

In another preferred aspect, the method of the present disclosure further comprises repeating periodically the automatically searching databases or sending search requests to the one or more record-keepers including the first record-keeper for the second retirement account.

In another preferred aspect, the method of the present disclosure further comprises sending to the record-keeper of the second account, data and funds of the owner's SHIRA-eligible account to be rolled over into the second account upon not receiving any other instructions from the owner within the time period and upon finding the second account.

In another preferred aspect, the present disclosure comprises a method performed by one or more processing devices, via one or more networks, for the proactive, without initiation by each owner of one of a plurality of first retirement accounts, and automatic portability of the first retirement accounts, comprising: automatically searching databases or sending search requests to one or more record-keepers to determine whether each owner of one of the plurality of first retirement accounts also owns a second retirement account; amending an electronic data record associated with a respective one of the plurality of first retirement accounts to indicate either that a respective second retirement account was or was not found; and sending a negative consent notification having a date to each owner for which a respective second retirement account has been found; wherein the negative consent notification advises the owner that unless the owner provides other instructions within a time period from the date, the owner's respective first retirement account shall be rolled over, in-whole or in-part, into the owner's respective second retirement account or vice versa.

In another preferred aspect of the method of the present disclosure, each of the electronic data records was received from a first record-keeper of the one or more record-keepers.

In another preferred aspect of the method of the present disclosure, the other instructions comprise: (i) having a cash distribution issued from the owner's first and/or second retirement account; (ii) have the owner's first retirement account rolled over, in-whole or in-part, into said owner's second retirement account or vice versa; or (iii) have the owner's first and/or second retirement accounts maintained as is without effecting any cash distribution, rollover or other modification.

In another preferred aspect, the method of the present disclosure further comprises receiving instructions from one or more of the owners to effect one or more of the following actions: (i) a cash distribution issued from the owner's first and/or second retirement account; (ii) a rollover, in-whole or in-part, of the owner's first retirement account into said owner's second retirement account or vice versa; and/or (iii) maintaining the owner's first and/or second retirement account as is without effecting a cash distribution, rollover or other modification.

In another preferred aspect, the method of the present disclosure further comprises sending to the first record-keeper the instructions received from the one or more owners.

In another preferred aspect of the method of the present disclosure, each of the plurality of electronic data records received relates to a SHIRA-eligible account.

In yet another preferred aspect of the method of the present disclosure, each of the plurality of electronic data records received relates to a non-SHIRA-eligible account.

In another preferred aspect of the method of the present disclosure, each of the respective first retirement accounts is a SHIRA-eligible account and each of the respective second retirement accounts is a non-SHIRA-eligible account.

In yet another preferred aspect of the method of the present disclosure, each of the respective first retirement accounts is a non-SHIRA-eligible account and each of the respective second retirement accounts is a non-SHIRA-eligible account.

In another preferred aspect of the method of the present disclosure, each of the respective first retirement accounts is a SHIRA eligible account and each of the respective second retirement accounts is a non-SHIRA-eligible account.

In another preferred aspect of the method of the present disclosure, each of the respective first retirement accounts is a non-SHIRA-eligible account and each of the respective second retirement accounts is a non-SHIRA-eligible account.

In another preferred aspect of the method of the present disclosure, each of the respective first retirement accounts is a SHIRA eligible account and each of the respective second retirement accounts is a non-SHIRA-eligible account.

In yet another preferred aspect of the method of the present disclosure, each of the respective first retirement accounts is a non-SHIRA-eligible account and each of the respective second retirement accounts is a non-SHIRA-eligible account.

In another preferred aspect, the method of the present disclosure further comprises setting a timer to expire at the end of the time period from the date.

In yet another preferred aspect, the method of the present disclosure further comprises sending to the first record-keeper, an updated file identifying each owner who has not provided instructions as of the end of the time period extending from the date and account information for each such owner's respective second retirement account.

In another preferred aspect, the method of the present disclosure further comprises setting a timer to expire at the end of the time period from the date.

In yet another preferred aspect, the method of the present disclosure further comprises sending to the first record-keeper, an updated file identifying each owner who has not provided instructions as of the end of the time period extending from the date and account information for each such owner's respective second retirement.

In another preferred aspect, the present disclosure comprises a system for the proactive, without initiation by an owner of a first retirement account, and automatic portability of the first retirement account, comprising: one or more processing devices; and one or more machine-readable media configured to store instructions that are executable by the one or more processing devices to perform operations comprising: automatically searching databases or sending search requests to one or more record-keepers for a second retirement account owned by the owner; amending an electronic data record associated with the first retirement account to indicate either that the second retirement account was or was not found; sending a negative consent notification having a date to the owner; wherein the negative consent notification advises the owner that unless the owner provides other instructions within a time period from the date, the first retirement account shall be rolled over, in-whole or in-part, into the second retirement account or vice versa; automatically maintaining an audit trail record in or associated with said electronic data record for the first retirement account; wherein said audit trail record contains historical information for each action taken with respect to the first retirement account and/or its associated electronic data record; and using the historical information of the audit trail record for the first retirement account as the sole or partial basis for determining a future action to be taken with respect to the first retirement account.

The details of one or more implementations are set forth in the accompanying drawings and the description below. Other features will be apparent from the description and drawings, and from the claims.

DETAILED DESCRIPTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the disclosed subject matter. Such embodiments of the disclosed subject matter may be referred to, individually and/or collectively, herein by the term "disclosure" merely for convenience and without intending to voluntarily limit the scope of this application to any single disclosure or concept if more than one is in fact disclosed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, a computing system or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

FIG. 1 illustrates a preferred ARIS of the present disclosure designated generally by the reference numeral 1, in block diagram form.

In a preferred embodiment, ARIS and steps performed therein or thereby comprises a clearinghouse 2 for retirement accounts owned by a plurality of individuals and administered and/or maintained by a plurality of recordkeepers 3 such as retirement plan sponsors, employers, third party retirement plan administrators, investment advisory firms and/or brokerage firms, that may or may not be members of the clearinghouse 2. FIG. 1 provides an overview of the primary ways in which member record-keepers 3 communicate or interact with clearinghouse 2, preferably via one or more network connections 4 over one or more networks, such as the Internet (not shown).

The primary and preferable interaction scenarios between member record-keepers 3 and clearinghouse 2 are labeled A, B, C and D in FIG. 1; each of which is shown in more detail in FIGS. 2-5, respectively.

Regarding Scenario "A", at step 10, for example, a member record-keeper 3 opens a new retirement account 5, such as a 401(k) account, an IRA, a 403(b) account, a 457 account, a 401(a) account, or a profit sharing account for an account owner 6, verifies that account owner 6 is a participant in a qualified plan, also that such plan accepts roll-in contributions and that the account owner/participant/employee 6 is eligible to have roll-ins into his/her account 5.

At step 11, member record-keeper 3 "Pings" or sends an electric communication over a network connection 4 to clearinghouse 2 wherein the communication comprises: identification information for account owner 6, such as social security number, account number, last name, first name and date of birth ("DOB"). Clearinghouse 2 accepts the "ping" or web service communication call at 12; searches its internal database or inventory of accounts at 13 for one or more accounts 7, such as retirement accounts, owned by the same account owner 6. If no other accounts 7 owned by owner 6 are found, at 14 clearinghouse 2 sends a "no match" communication back to member record-keeper 3 via network connection 4. If one or more other accounts 7 owned by owner 6 is/are found, at 15 clearinghouse 2 creates a "PMID" identification number 16 and sends such PMID identification number 16 to Record keeper 3 via network connection 4 at 17. Clearinghouse 2 then creates and/or prepares any required distributions, notices and/or forms at 18 necessary to effect a qualified roll-in of the one or more other found accounts 7 owned by the account owner 6 into account 5. Meanwhile, member record-keeper 3 receives either the "no match" communication 14 or PMID number 16 and at 19 processes such communications by either moving on, at 20, to process an account for the next account owner/participant or by storing in a memory the PMID number 16 in association with all data and funds for account 5.

Clearinghouse 2 liquidates the one or more other accounts 7 which likely comprise IRAs at 22 and sends the liquidated funds and all required roll-in forms at 23 to member record-keeper 3 via network connection 4. At 24, member record-keeper 3 receives such funds and required roll-in forms and sends a confirmation of such receipt to clearinghouse 2 via network connection 4. At 25, clearinghouse 2 receives such confirmation and stores the same along with the PMID number 16 for the other account 7 and sends a confirmation notice to the account owner/plan participant 6. At 26, member record-keeper 3 receives funds from the other account 7 for rolling into account 5 and sends confirmation of receipt of funds to clearinghouse 2 via network connection 4.

Figure 3:
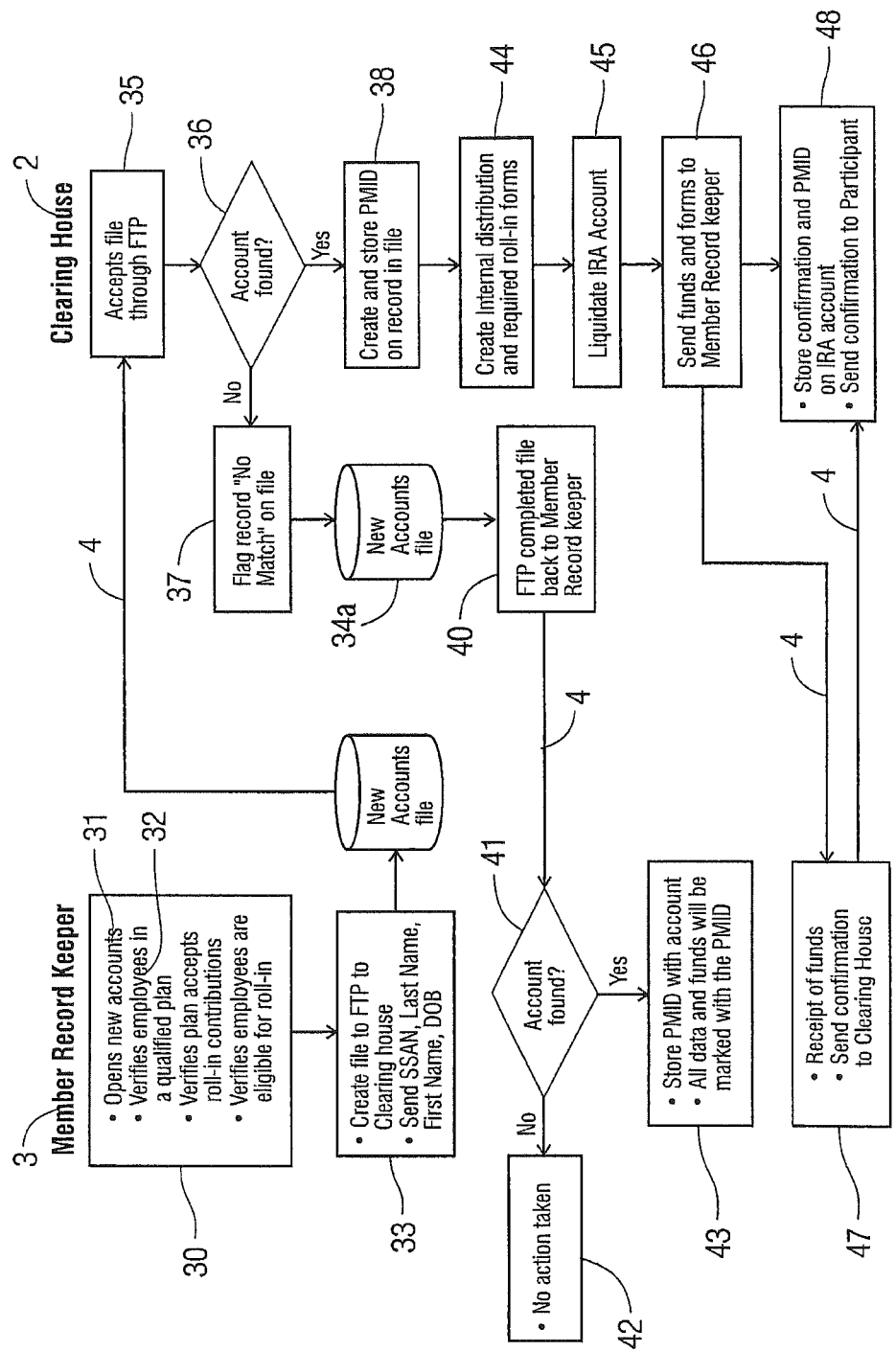
FIG. 3 is a flowchart showing a second preferred manner in which member record-keepers interact with a clearinghouse of a preferred ARTS of the present disclosure.

As shown in FIGS. 1 and 3, in Scenario "B" member record-keeper 3 processes many new plan participant accounts at once, for example, when opening a plurality of new accounts for a new client's employees participating in a qualified retirement plan administrated by member record-keeper 3. Thus, at 30, member record-keeper 3 opens a plurality of new accounts 31, verifies that under the plan rules that each account owner 32 is an employee in the qualified retirement plan; that such plan allows for roll-in contributions and that the account owner/employee 32 is eligible to have roll-in contributions made to his/her account 31.

Member record-keeper 3, at 33, creates an FTP file 34 containing the particulars for all the new accounts 31, such as social security number, last name, first name and date of birth for each account owner 32 that owns one or more of the plurality of accounts 31 to send to clearinghouse 2 via file transfer protocol (FTP) at 35 via a network connection 4, such as over the Internet. At 36, clearinghouse 2 electronically searches its database or inventory of accounts, as well as sends search requests, either individually or in batch via FTP files as described below to other member record-keepers 3 of clearinghouse 2, for other accounts 39 owned by each respective owner 32 of one of the plurality of accounts 31 in FTP file 34. For each of the plurality of accounts 31 where no matching account has been found, such accounts 31 are flagged at 37 in the FTP file with a "no match" flag while at 38 a PMID number 16 is created and stored for each other account 39 found that matches one of the plurality of accounts 31 in FTP file 34. The PMID number 16 is stored in FTP file 34a in association with its respective matching account 31 owned by same owner 32. After FTP file 34a has been completed for each of the plurality of accounts 31 by associating/storing a "no match" flag or a PMID number 16 with each account 31 therein, FTP file 34a is sent back to member record-keeper 3 by file transfer protocol via network connection 4 at 40.

Member record-keeper 3, at 41, determines and/or reviews whether or not a matching account 39 was found by clearinghouse 2 for each of the plurality of accounts 31. Those accounts 31 for which no other matching accounts 39 were found are parked, at 42, by member record-keeper 3 and no further action is taken for the time being with respect to these unmatched accounts, except that they may be periodically included in FTP files, sent to the clearinghouse 2 as the basis of future searches for matching accounts. At 43, member record-keeper 3 stores the unique PMID number 16 for each account 31 in association with that account and will mark all data and funds associated therewith, with that respective PMID number as well. Meanwhile, at 44, clearinghouse 2 creates and/or prepares any required distributions, notices and/or forms under the qualified retirement plan rules, necessary to effect a qualified roll-in of the one or more other matching accounts 39 into one of the plurality of accounts 31. Matching accounts 39 to one of the plurality of accounts 31 are those owned by the same employee/plan participant 32. Clearinghouse 2 liquidates each of the matching accounts 39 which likely comprise IRA accounts at 45 and sends the liquidated funds and all required roll-in forms, preferably in a batch process, at 46 to member record-keeper 3 via network connection 4. At 47, member record-keeper 3 receives such funds and required roll-in forms to roll-in the funds from each matching account 39 to its respective account 31 and sends a confirmation of such receipt to clearinghouse 2 via network connection 4. At 48, clearinghouse 2 receives that confirmation and stores the same along with the PMID numbers 16 for each account 39 and sends a confirmation notice of the roll-in to each respective account owner/employee 32.

Figure 4:
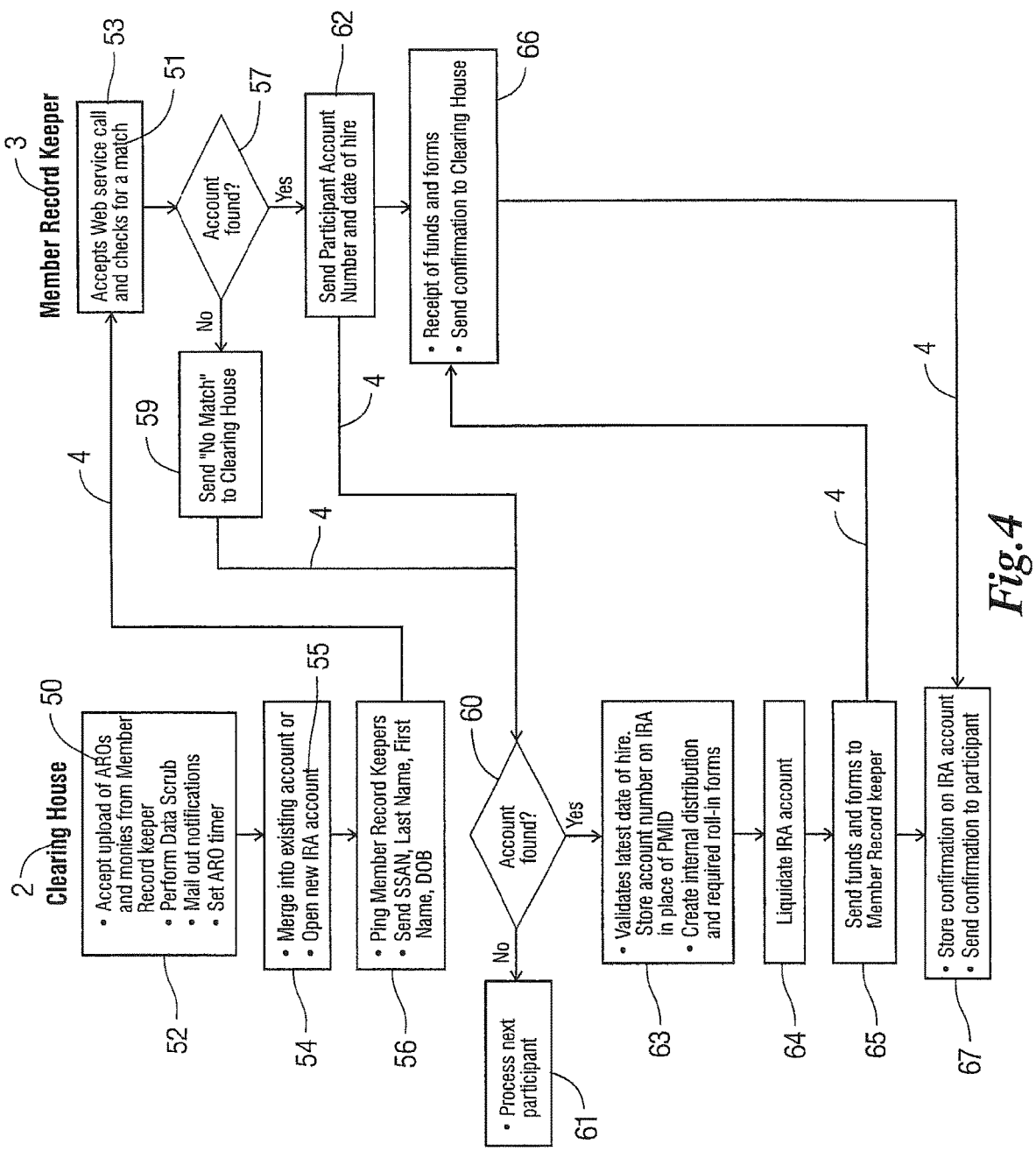
FIG. 4 is a flowchart showing a third preferred manner in which member record-keepers interact with a clearinghouse of a preferred ARIS of the present disclosure.

Referring now to FIGS. 1 and 4, Scenario "C" exemplifies the manner in which clearinghouse 2 can assist member record-keepers 3 in creating, funding and/or processing AROs and ultimately matching AROs 50 up with other matching accounts, preferably retirement accounts and most preferably a retirement plan account owned by an individual owner or retirement plan participant into which contributions from an employee's wages/salary are still being made. At 52, clearinghouse 2 accepts an account data file and funds for an ARO account 50 for account owner 6; performs a data scrub to examine the account data file for competency and rejects any such records not in compliance and returns the same to member record-keeper 3; the clearinghouse 2 may also send the account data record out to a verification service to verify the information therein and the identity or account owner 6. At 54, clearinghouse 2 opens a new IRA account in name of account owner 6 then pings, at 56, all of the member record-keepers 3, including the member record-keeper 3 from whom clearinghouse 2 received the account data record, and sends the account owners social security number (SSAN), last name, first name and date of birth. The member record-keepers 3, at 53, each accept the ping or web service call from clearinghouse 2 and each searches its internal records for a matching account 51 defined as an account owned by the same individual that owns the ARO 50 in question.

Clearinghouse 2 also mails any required notifications out to the account owner 6 and sets an automated timer to stipulate the period of time that the account owner 6 has to take action before the ARO 50 is automatically rolled into an IRA 55, such as a "Safe Harbor" account under Section 401(a)(31) of the Internal Revenue Service Code of 1986 as amended by the EGTRRA. If no matching account 51 is found by a member record-keeper 3 for account 55 owned by owner 6, at 59, that member record-keeper 3 sends a "no match" notice back to clearinghouse 2. At 60, clearinghouse 2 determines whether a matching account 51 has been found after receiving feedback from each of the member record-keepers 3. If no matching account 51 is found, clearinghouse 2 at 61 moves on to process an ARO 50 owned by another account owner. Periodically, clearinghouse 2 will again send search requests out for matching retirement accounts owned by account owner 6 to match up with IRA account 55. If a matching account 51 is found by a member record-keeper 3 at 57, the member record-keeper 3 at 62 sends the member number and date of hire of the participant/account owner 6 to clearinghouse 2 via network connection 4. Clearinghouse 2, at 60, determines that a matching account had been found and at 63 validates the latest date of hire and stores the participant account number in association with IRA 55 in place of any PMID number and further creates all required distribution and roll-in forms necessary to effect a qualified roll-in of IRA 55 into matching account 51.

At 64, clearinghouse 2 liquidates IRA 55 and sends, at 65, those funds and all required roll-in forms (which preferably comprise electronic forms) to member record-keeper 3 via network connection 4. At 66, member record-keeper 3 receives the funds to be rolled into matching account 51 and forms for the same, which preferably, is a retirement account comprising a 401(k) account or a profit sharing account under a qualified retirement plan administered by member record-keeper 3 and the contribution of funds from account 55 into such retirement account 51 constitutes a qualified rollover pursuant to all applicable rules and regulations. Further at 66, member record-keeper 3 sends a confirmation of the receipt of the funds and roll-in forms to clearinghouse 2 via network connection 4. Clearinghouse 2 receives the same at 67, stores the confirmation in its data record for IRA account 55 and sends a notification of the automatic rollover transaction to participant/account owner 6.

Figure 5:
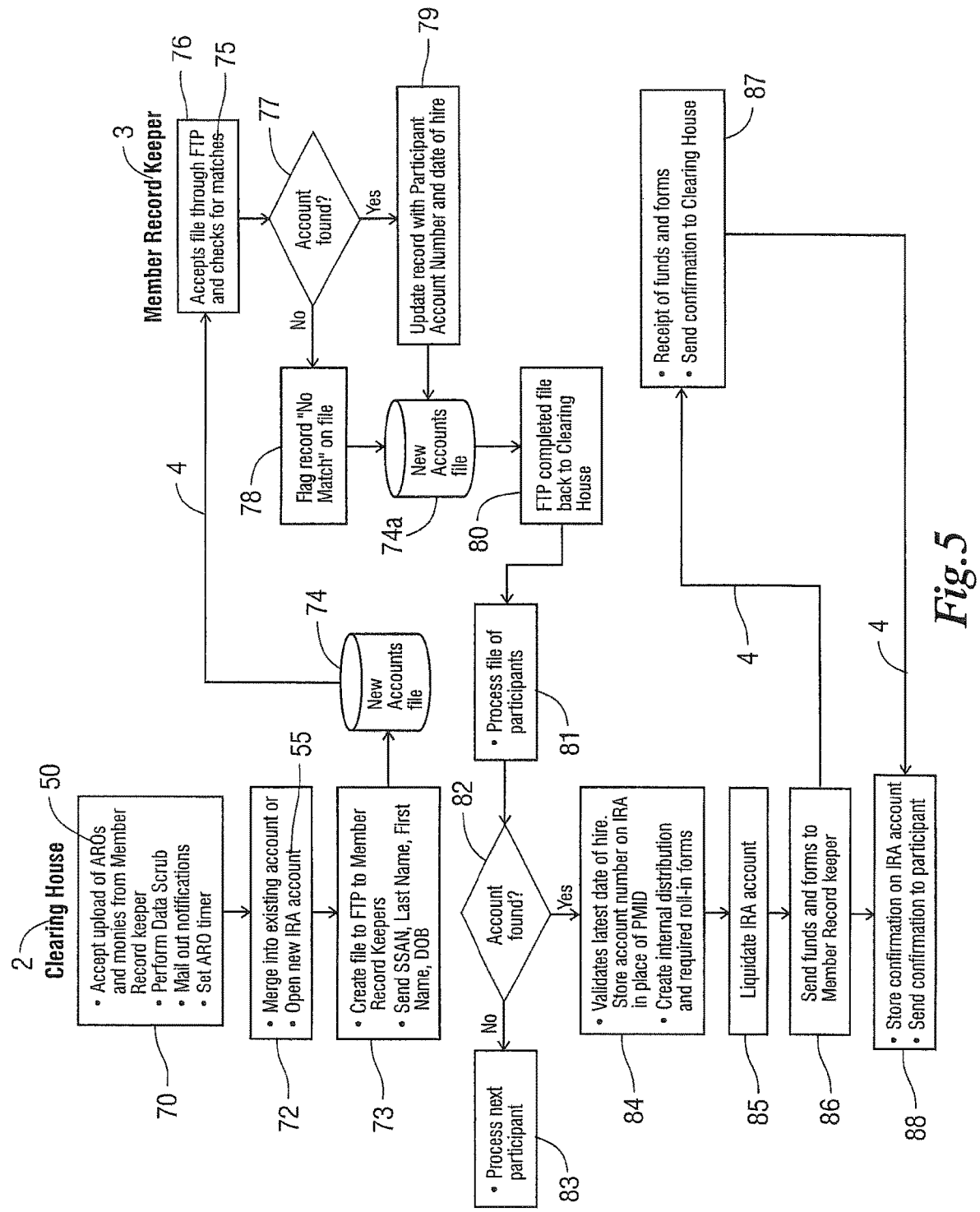
FIG. 5 is a flowchart showing a fourth preferred manner in which member record-keepers interact with a clearinghouse of a preferred ARIS of the present disclosure.

Turning to FIGS. 1 and 5, Scenario "D" is illustrated wherein clearinghouse 2 receives at 70 a plurality of data records for a plurality of AROs 50 along with the monies/funds in aggregate to cover the individual amount for each ARO 50; clearinghouse 2 performs a data scrub and review of the data record for each ARO 50 and returns to member record-keeper 3 any data records and funds that are not in compliance with all applicable rules and regulations. Clearinghouse 2 also sends all required notifications to each account owner/participant 6 who owns one of the plurality or ARO accounts 50. Clearinghouse 2 then sets the requisite timer for each of the plurality of AROs 50 to stipulate the time when each owner 6 must give instructions with respect to its account 50 before it is rolled into an account, such as an IRA account held in a repository 100 of the clearinghouse 2.

At 72, clearinghouse 2, after the requisite time period has passed without receipt of instructions from the account owner 6 for each ARO 50, either opens a new retirement account, such as an IRA 55, or consolidates the funds for each ARO 50 into a pre-existing account commonly owned by the respective owner 6 held in the repository 100 of clearinghouse 2. At 73, clearinghouse 2 creates an FTP file 74 containing the particulars including social security number, last name, first name and date of birth for each of the IRA/pre-existing accounts 55 for which matching accounts 75 will be sought from among all member record-keepers 3, and sends such FTP file 74 via network connection 4 to one or more of, and preferably all of the member record-keepers 3, wherein each member record-keeper 3 receives FTP File 74 and searches its account databases and/or inventories at 76 for matching accounts 75. At 77, each member record-keeper 3 determines whether one or more matching accounts 75 have been found for each IRA/pre-existing account 55 in FTP file 74. For each of the plurality of IRA/pre-existing accounts 55 for which no matching account is found, such accounts are flagged, at 78, with a "no match" flag while at 79 the FTP file 74 is updated by associating/storing the participant account number and date of hire of each matching account 75 found with its respective IRA/pre-existing account 55 to create FTP file 74a. After FTP file 74a has been completed at 80 for each of the plurality of IRA/pre-existing accounts 55 by associating/storing therein a "no match" flag or participant account number and date of hire information with each account 55 therein, FTP file 74a is sent back to clearinghouse 2 via network connection 4. Clearinghouse 2 processes FTP file 74a at 81 and determines at 82 whether a matching account 75 was found or not for each IRA/pre-existing account 55. At 83, those IRA/pre-existing accounts 55 for which no matching accounts 75 were found are parked and no further action is taken with respect to these accounts, except that they are maintained in the repository 100 of accounts in the clearinghouse 2 and may be again included periodically in FTP files sent out to member record-keepers 3 in search of matching files therefore.

At 84, clearinghouse 2 determines that matching accounts have been found for a number of the IRA accounts 55 and with respect to each matching account from FTP file 74a, validates the date of hire information for each account owner 6 and stores the participant account number in association with its respective IRA 55 in place of any PMID number and further creates all required internal and external (as required by the particular qualified plan) documents and forms required to effect a qualified rollover of each IRA account 55 into its matching account 75. At 85, clearinghouse 2 liquidates each IRA 55 for which a matching account has been found and at 86 sends an aggregate of funds to fund all rollovers to be effected by a given member record-keeper 3, as well as the required forms (preferably electronic forms) for each such qualified rollover to each respective member record-keeper 3 preferably via internet connection 4.

At 87, member record-keeper 3 receives the funds and forms to effect the respective qualified rollover transactions into the matching accounts 75, preferably which comprise a 401(k) account, an IRA account, a 403(b) account, 457 account, a 401(a) account or a profit sharing retirement account under a qualified retirement plan being administered by member record-keeper 3 and in which the account owner/participant 6 is currently a participant in. Member record-keeper 3 then sends a confirmation of its receipt of the funds and rollover forms to clearinghouse 2, via network connection 4, which stores, at 88, such confirmation information in association with its data record for each "matched" account 55 and sends a notice to each affected owner 6 whose account has been automatically rolled over into another one of his or her accounts.

Figure 6:
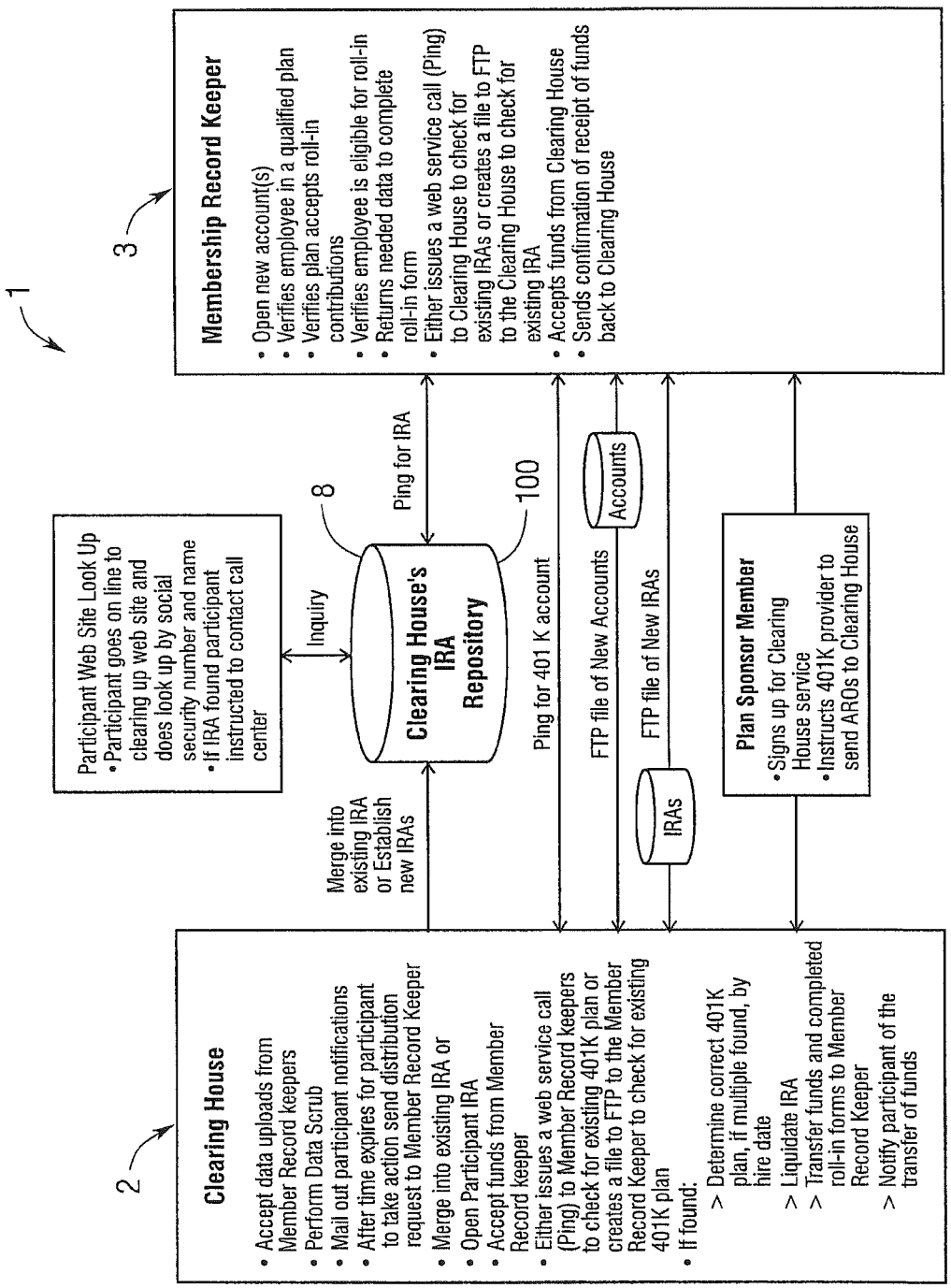
FIG. 6 is a flowchart of showing additional preferred aspects of a preferred ARIS of the present disclosure.

As shown in FIG. 6, preferred functions of the technology, components and processes of ARIS of the present disclosure driven by a preferred Rules & Transaction Engine, include:

Function 1: Receive Consumer Data Record. Source record-keeper member 3 initiates a file transfer to using TCP/IP (internet) and PGP security protocol to pass consumer data records to the ARIS 1 consumer record database (server). These transfers will happen on a regular basis from all record-keeper members 3 to the ARIS 1.

Function 2: Data Scrub: The ARIS 1 clearinghouse 2 examines the consumer data record on the server for completeness and rejects any records not in compliance with applicable rules, regulations in the rules and transaction engine. The rules & transaction engine application then batches the good records together in a new file and transmits the file to a data verification service (i.e. LexisNexis, Experian, NCOA (National Change of Address) to verify address, social security and name match, etc. Bad records are automatically returned to the source (member record-keeper 3) for correction/quality control.

Function 3: Schedule & Execute Required Notification. The verified consumer data Record will be mailed merged using a proprietary application into a consumer notification letter, as scheduled by the rules & transaction engine application of clearinghouse 2. There are a number of different types of letters based on the account balance of a consumer's retirement account and the provisions particular to each retirement plan. If the consumer falls into the Mandatory Distribution category, then the IRS notification (402f) will be included with the letter, along with a Safe Harbor IRA product description, and the notification that an electronic search will be done by the ARIS 1 rules & transaction engine application of the accounts held by other record-keeper members 3 to determine whether any of the record-keeper members 3 hold an active 401(k) or IRA account that the consumer retirement account is eligible to be rolled into. In the instance of a Mandatory Distribution, an automated "timer" will be initiated to stipulate the period of time that the consumer or account owner has to take action before the account is automatically rolled into a consumer retirement account, such as an IRA, held by the ARIS 1 account repository 100. The ARIS 1 rules & transaction engine application will record and store a unique "timer" as specified by each plan sponsor member's 3 retirement plan provisions.

For larger balance consumer retirement accounts, the same search will be performed, and if found, (see Function 4) the ARIS 1 rules & transaction engine application will schedule and execute a letter to be mailed to the account owner asking if they want to consolidate their inactive account into their active account. The active account could also be an existing IRA.

Function 4: Search & Locate (PING): Initial Identification: A 'Ping' or web service call (A Web service call which is a software system designed to support interoperable machine-to-machine interaction over a network. It has an interface described in a machine-processable format, specifically Web Services Description Language, known by the acronym WSDL. Other systems interact with the Web service in a manner prescribed by its description using SOAP messages, typically conveyed using HTTP with an XML serialization in conjunction with other Web-related standards.) will be sent as scheduled by the rules & transaction engine application to all record-keeper members 3, in series, to determine whether the Consumer has an account at a record-keeper member 3. Social Security Number will be used for the initial identification and record match. If a record match is found, then Function 5 will occur.

Function 5: Matching Record Found:

a. Determine Consumer Status—Record keeper members 3 will return an "Active" or "Inactive" status code for each Matching Record b. If Active:

i. ARIS system 1 performs a Secure Identification Protocol: A number of data elements are used to make certain that the correct consumer record for a retirement account has been found. These data elements are customizable for each record-keeper member 3. For example: a first record-keeper members 3 requires validation of: social security number, first and last name, city and state of home address. Another record-keeper member 3 requires validation of: social security number, first and last name, street address, and zip code. Yet another record-keeper member 3 requires validation of: social security number, first and last name, birth date. The ARIS system/application 1 passes only those validation data elements required by each record-keeper member 3, through the web service call.

ii. If the Secure Identification Protocol is confirmed, the destination record-keeper member 3 will return the account number needed for the account transfer, as well as all information needed to complete the required roll-in forms.

iii. The ARIS 1 rules & transaction engine application creates the necessary data records—or completes the hard copy forms—to pass back to the source record-keeper member 3 to liquidate the current account and forward the money to the ARIS lock box (electronic or physical). The ARIS 1 rules & transaction engine application will monitor activity in the ARIS lock box to determine when money has been deposited for each Consumer account. The ARIS 1 rules & transaction engine application will then complete the transaction by causing the money to be moved to the destination record-keeper member 3 account, and will track, record, and reconcile the movement of the account and money from the ARIS 1 physical or electronic lock box to the destination record-keeper member 3.

Function 6: Matching Consumer Record Not Found:

Mandatory Distributions: The ARIS 1 rules & transaction engine application creates an IRA in the ARIS 1 account repository 100 and schedules recurring Pings or messages to continue to search for and locate consumer retirement accounts in destination record-keeper members' 3 systems and will repeat the search and locate Function 4 above until a matching consumer retirement account is found in a system of a record-keeper member 3. Preferably, the ARIS 1 account repository 100 will hold all consumer retirement accounts while they remain in search & locate status, performing normal and customary qualified retirement account services for all consumer retirement accounts.

b) Voluntary Distributions: The ARIS 1 application will schedule and send out periodic communications to account owners to solicit their interest in receiving services of ARIS 1.

Figure 7:
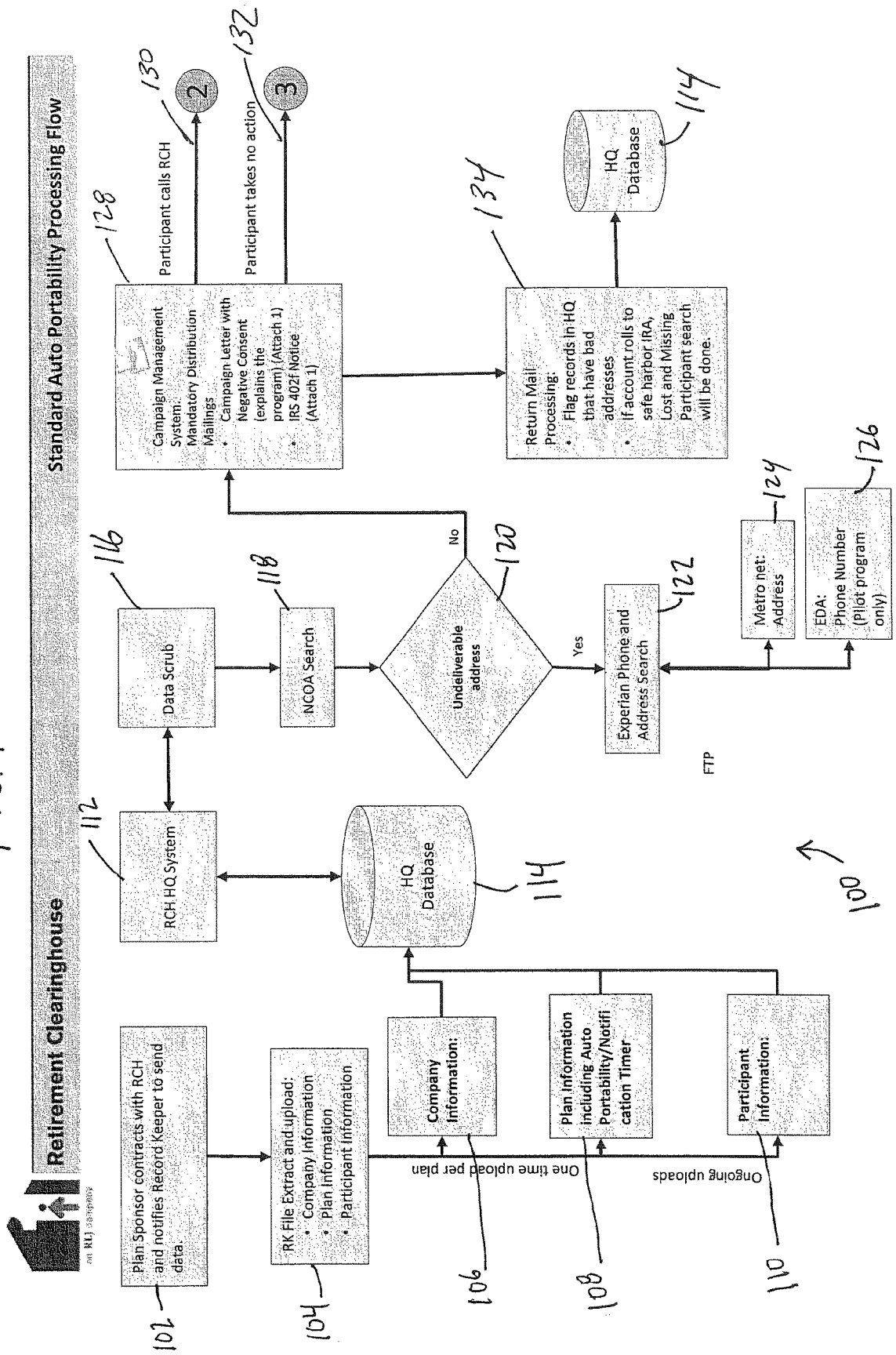
FIG. 7 is a flowchart showing an overview of various aspects of a preferred PAPIRAS of the present disclosure incorporating a negative consent notification.

System/Method for Proactive Auto Portability of Individual Retirement Accounts Based Upon Negative Consent A preferred computer implemented method of the present disclosure, carried out over one or more networks, for the proactive, without initiation by an owner of a first retirement account, and automatic portability of the first retirement account is shown in FIG. 7 in block diagram form and referred to generally as PAPIRAS 101. In this preferred embodiment, designated as a "standard auto portability" method where a record-keeper has predetermined that it will, using a "negative consent notification" automatically consolidate another retirement account owned by the participant with the first retirement account held by the record-keeper, subject to any other instructions received by the participant/owner of the accounts. In this case, the other retirement account may also be maintained by the record-keeper or another record-keeper. Additionally, the consolidation may flow either way where the first retirement account is rolled into the other retirement account or vice versa, depending upon the type of retirement accounts involved.

At 102, a plan sponsor contracts with Retirement Clearing House (RCH) 112 and notifies a record-keeper, which is a member of or otherwise has a contractual relationship with RCH 112, to send data to RCH 112 regarding individual retirement accounts.

At 104, the record-keeper's file is extracted and uploaded. Such file typically contains company information for the record-keeper, plan information for the retirement plan and participant information for the participants in the retirement plan. Company information 106, plan information including requirements and particulars for auto portability and notification timers 108, and participant information 110 are stored in the RCH database 114 which is accessed by the RCH main system 112 (RCH 112). Preferably, each time RCH 112 takes an action with respect to a data file for any individual retirement account or other account, RCH 112 creates and maintains an audit trail as part of or in association with each such data file. Such an action could include, without limitation, searching databases of PAPIRAS 101 for other commonly owned account(s); sending search requests to record-keepers to search for other commonly owned account(s); sending notices including negative consent notices to the owner of the individual retirement account; receipt of instructions from the owner of the individual retirement account such as for making a distribution or for opting-out of an automatic roll-over program; and/or making a partial or complete distribution between the individual retirement account associated with such data file and other commonly owned account(s). Preferably, PAPIRAS 101 and RCH 112 may routinely use the updated audit trail of each data file as the sole or partial basis to determine future actions to be taken with respect to the associated individual retirement account or other account, such as when and where (such as internally or with other record-keepers) to conduct future searches for other commonly owned account(s).

At 116, RCH 112 performs a data scrub on the participant information by examining these records for completeness and seeks to rehabilitate any records not in compliance with applicable rules and regulations. For instance, at 118, RCH 112 may transmit data to or otherwise perform a search on the National Change Of Address (NCOA) service to verify participant's address. If it is determined at 120 that an undeliverable address exists for a given participant, further searching on verification services may be employed such as Experian phone and address search at 122, metro net address verification at 124 or EDA phone number verification at 126.

For each verified address at 120, notification letters are sent to each plan participant at 128 by RCH 112 which explain the role of RCH 112 and setting forth that the participants retirement account will be automatically rolled over into a safe harbor IRA (SHIRA) with RCH 112 if the participant does not take action within a certain time period, generally 60 days. Also included in the notification is an IRS 402(f) notice as described herein. At 134, all notifications returned as being addressed to a undeliverable address will be flagged in the database 114 for each such account indicating a bad address. If no contact is received from participants having an undeliverable address, further lost and missing participant searches may be done.

Figure 8:
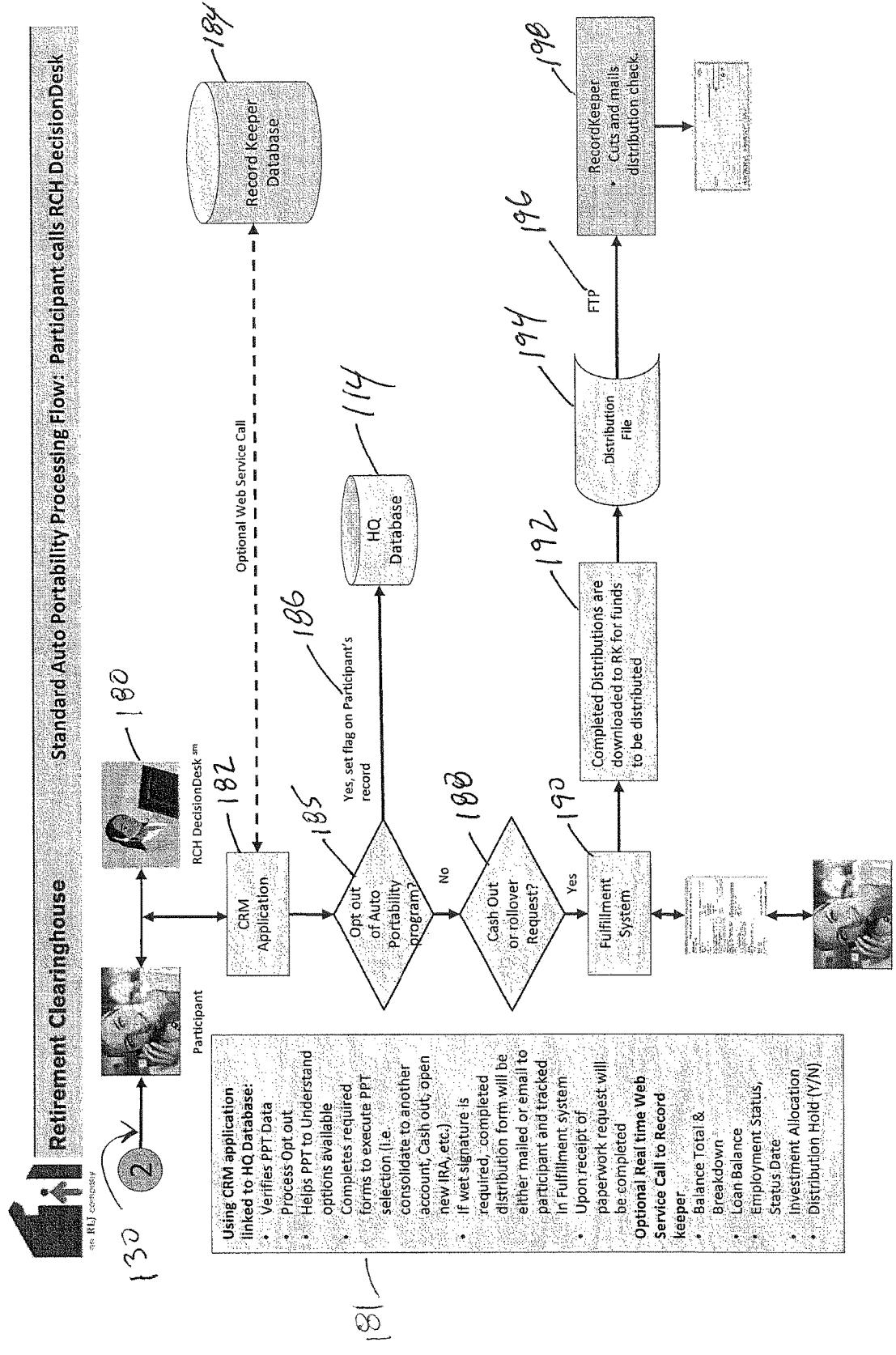
FIG. 8 is a flowchart showing a Customer Relations Manager (CRM) Application of a preferred PAPIRAS of the present disclosure incorporating a negative consent notification.

FIG. 8 illustrates the procedure of RCH 112 when a participant calls in response to the notification sent at 128. Generally, CRM application 182 of system 112, which optionally may place a web service call to record-keeper database 114 with updated information, is used to verify the participant data and whether or not the participant has elected to opt out of the auto portability system that is RCH 112. The CRM application 182 also helps owner/participant to understand the options available and to complete required forms to execute the participant's selection that is either to consolidate to another account, cash out or open a new IRA, etc. At 181, if a wet signature is required, the completed distribution form will be either mailed or emailed to the participant and tracked in the fulfillment system of RCH 112. Upon receipt of such paperwork the request will be completed. Optionally, a real-time web service call may be placed to the record-keeper database 184 to obtain real-time balance total and breakdown of the holdings in the account, any loan balances, employment status, status date, investment allocations, and whether any distribution hold are in place on the participant's account.

At 185, if the participant elects to opt-out of the auto portability program, a flag on participant's record is set in the database 114. If participant decides not to opt-out, at 188 it is determined whether the participant has elected to cash out of his account or to roll his account into another retirement account. For either type of distribution, at 190 RCH system 112 downloads completed distributions 192 to the record-keeper for funds to be distributed. At 194, a file containing all distributions for participants in a given plan is forwarded to the record-keeper at 196 which will then issue and mail those distribution checks 198.

Figure 9:
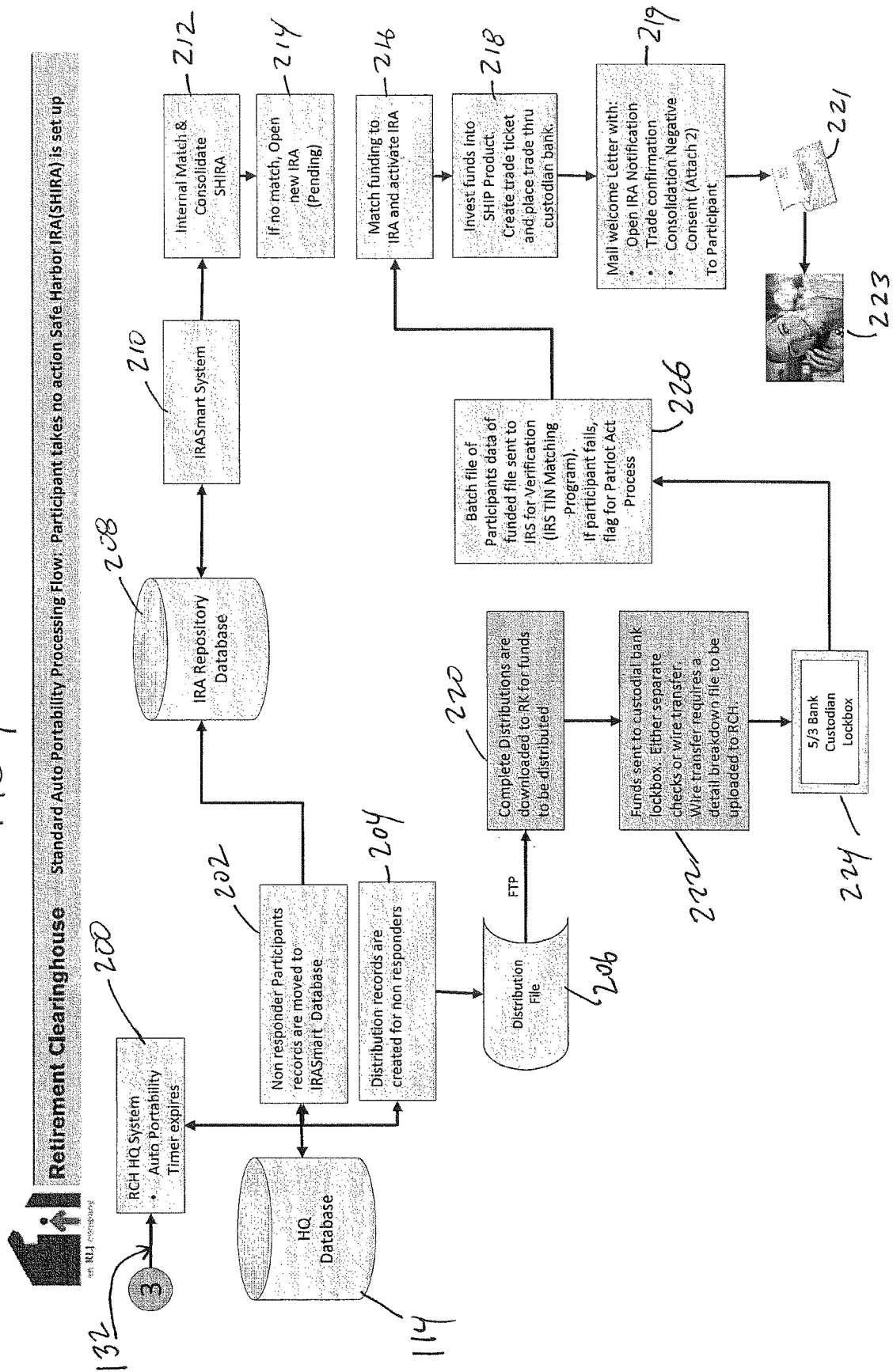
FIG. 9 is a flowchart showing SHIRA set-up in a preferred PAPIRAS of the present disclosure incorporating a negative consent notification.

FIG. 9 illustrates the procedure of RCH 112 when participant takes no action in response to the notification letter 128 from FIG. 7. At 132, after the time expires for participant to take action at 200, database 114 is updated with such information for all participants who did not respond. At 202, nonrespondent participant records are moved to an IRA database 208. Additionally at 204, distribution records are created for nonresponding participants and placed in file at 206. At 220, completed distributions are downloaded to the record-keeper for funds to be distributed at 222 which are placed in a custodial bank lockbox at 224 either by separate checks or wire transfer. If by wire transfer, a detailed breakdown file will also be uploaded to the RCH 112 before such wire transfer can be completed. The IRA System 210 of RCH 112 receives the information from the IRA database 208. At 212, RCH 112 does a search of internal RCH 112 records for other retirement account(s) owned by each participant. Where a match is found for a participant, the current account on which the search is based is rolled into such an RCH IRA also owned by the participant. Where no match is found at 214, RCH 112 opens a new IRA account for such participant. At 226, a batch file of participants' data from the funded file (220-224) is sent to the IRS for verification under the IRS TIN Matching program. For each participant that fails such verification, his or her data may be flagged for possible Patriot Act processing. At 216, RCH 112 matches funding for each IRA and activates each IRA. At 218, the funds for each participant are invested into SHIP products and a trade ticket is created and placed through the custodian bank.

At 219, RCH 112 sends a letter to each participant to notify them that (i) a SHIRA has been opened and that such an account has been enrolled in the automatic roll-in program whereby RCH 112 will periodically check for records of 401(k) and 403(b) providers to locate and match your IRA to an eligible account; (ii) if such a match is found, RCH 112 will close your current SHIRA account and consolidate your savings to the eligible account for a one-time fee; (iii) the participant will receive notification when such transaction is completed; and (iv) the participant may opt-out of such automatic roll-in program by contacting the RCH 112.

Figure 10:
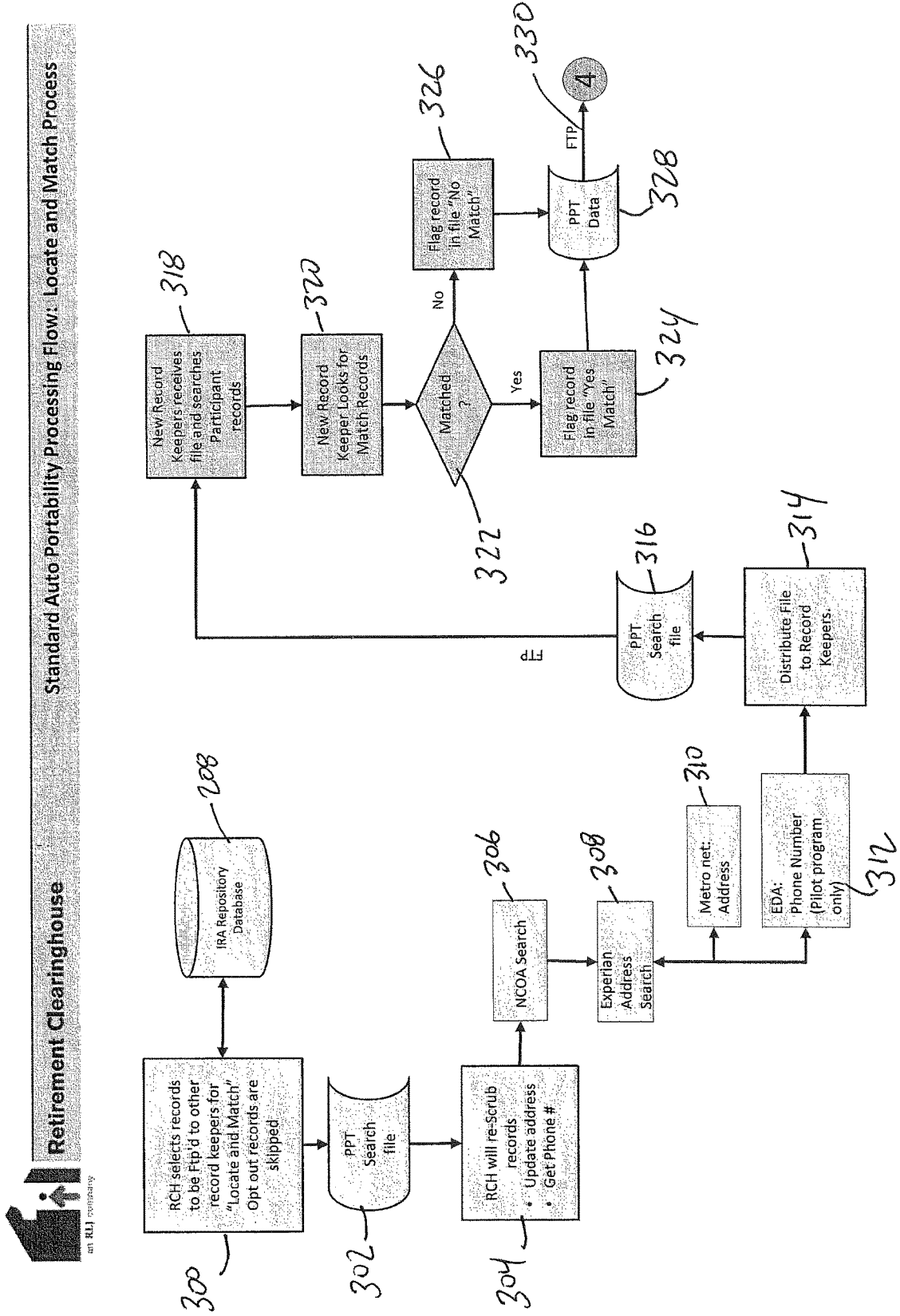
FIG. 10 is a flowchart showing a preferred locate and match process in a preferred PAPIRAS of the present disclosure incorporating a negative consent notification.
Figure 11:
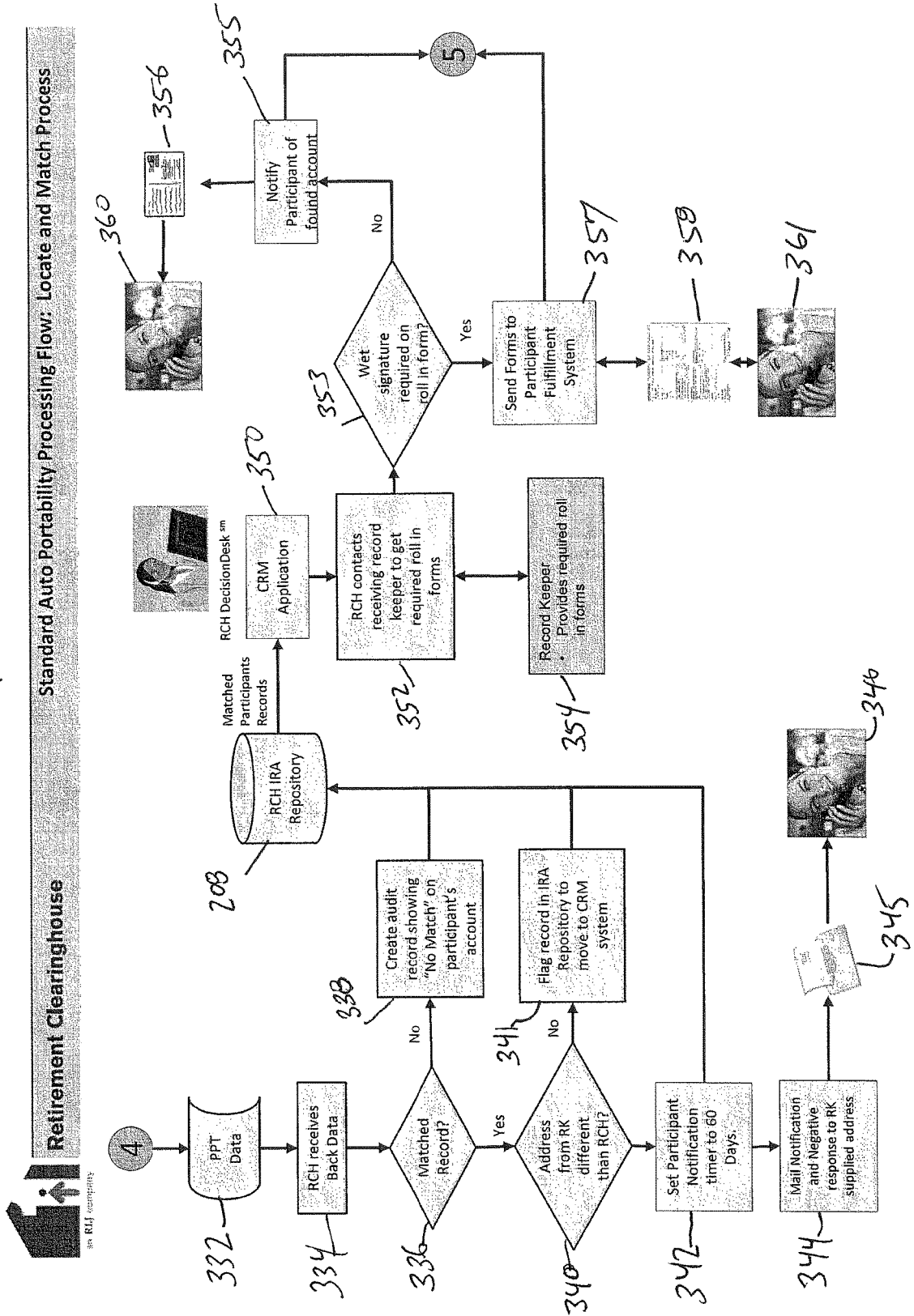
FIG. 11 is a flowchart showing additional aspects of the preferred locate and match process of FIG. 10 in a preferred PAPIRAS of the present disclosure incorporating a negative consent notification.

FIG. 10 illustrates the periodic searching performed by RCH 112 with respect to retirement accounts it has on file. At 300, RCH 112 selects data files for retirement accounts to be sent to record-keepers for the purpose of locating and matching existing eligible retirement account(s) owned by the same owner/participant. Opt-out records are not included. Such data files are selected from the IRA repository database 208. The data in search file 302 is again scrubbed at 304-312 as discussed above. At 314-316, the scrubbed data file is transferred to one or more record-keepers that have contracted with RCH 112 for the purposes of locating and matching retirement accounts within their respective records, as at 320. At 322-326, each account is flagged as either being matched (324) or not matched (326) with the data file being updated accordingly at 328. At 330, as shown in FIG. 11, the updated data file for participant retirement accounts 332 is received by RCH 112 at 334. At 336, if there is no match, an audit record is created on the same on participant's account at 338. If a match does exist, at 340 the address from the record-keeper is compared to the address in the records of RCH 112. If such addresses are not different, the record for the account is flagged in the IRA repository 208 to move the account to the CRM system at 350. If the addresses are different, at 342 a participant notification timer is set to 60 days and at 344 a notification 345 is sent to the participant advising that (i) this account has been enrolled in the automatic roll-in program whereby RCH 112 will periodically check records of 401(k) and 403(b) providers to locate a match of the owner's IRA to an eligible account; (ii) if such match is found the RCH 112 will close owner's IRA and consolidate owner's savings to the eligible account for a one-time fee; (ii) the owner/participant will receive notification when such transaction is completed; and (iv) if the owner wants to opt-out of the automatic roll-in program, the participant needs to contact RCH 112 as at 346.

Figure 12:
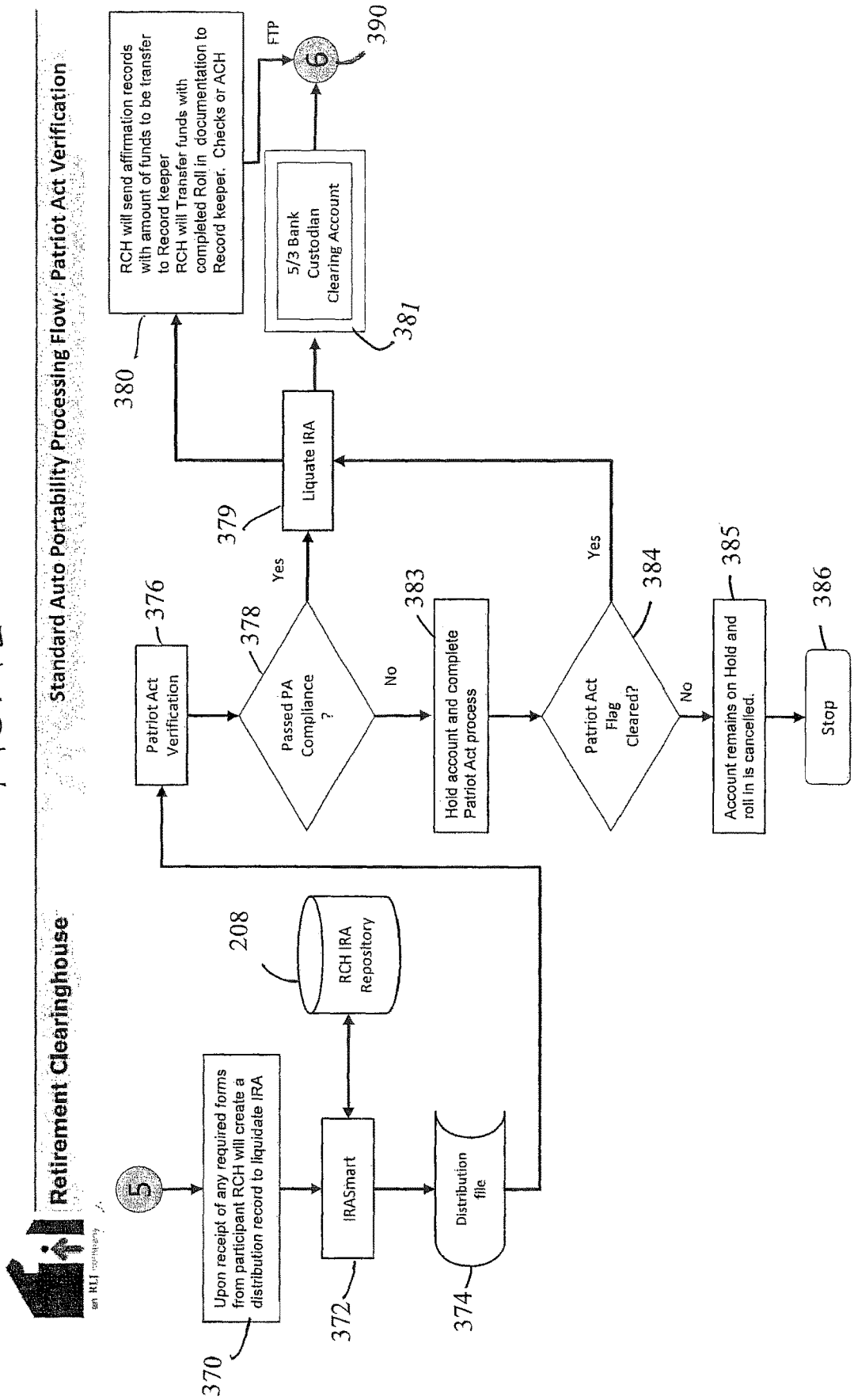
FIG. 12 is a flowchart showing preferred aspects of Patriot Act Verification procedures in a preferred PAPIRAS of the present disclosure incorporating a negative consent notification.

At 350, CRM application 350 of RCH 112 contacts the receiving record-keeper to get any required roll-in forms at 352. At 354, the record-keeper provides any required roll-in forms and as shown at 353, if a wet signature is required on the roll-in form, CRM application 350 sends forms 358 to the participant for such signatures as at 357. If the participant has questions, he or she may call the CRM application 350 as at 361. If a wet signature is not needed, at 355 a notification 356 is sent to the participant indicating that a matching account has been found and/or of the pending or completed roll-in of the retirement account, such as a SHIRA, into the found eligible account. At 359, RCH 112 will create a distribution record to liquidate the participants IRA upon receipt of any required forms from participant at 370. As shown in FIG. 12 at 372, the IRA distribution record will be stored in the RCH IRA database 208 while distribution 374 goes through a scrubbing or verification process at 376-386.

At 378, upon passing Patriot Act verification, the distribution file is liquidated at 379 with the funds being transferred to a custodial bank account 381. At 380, RCH 112 will send affirmation records with amount of funds to be transferred to the record-keeper and will transfer those funds with complete roll-in documentation as well.

Figure 13:
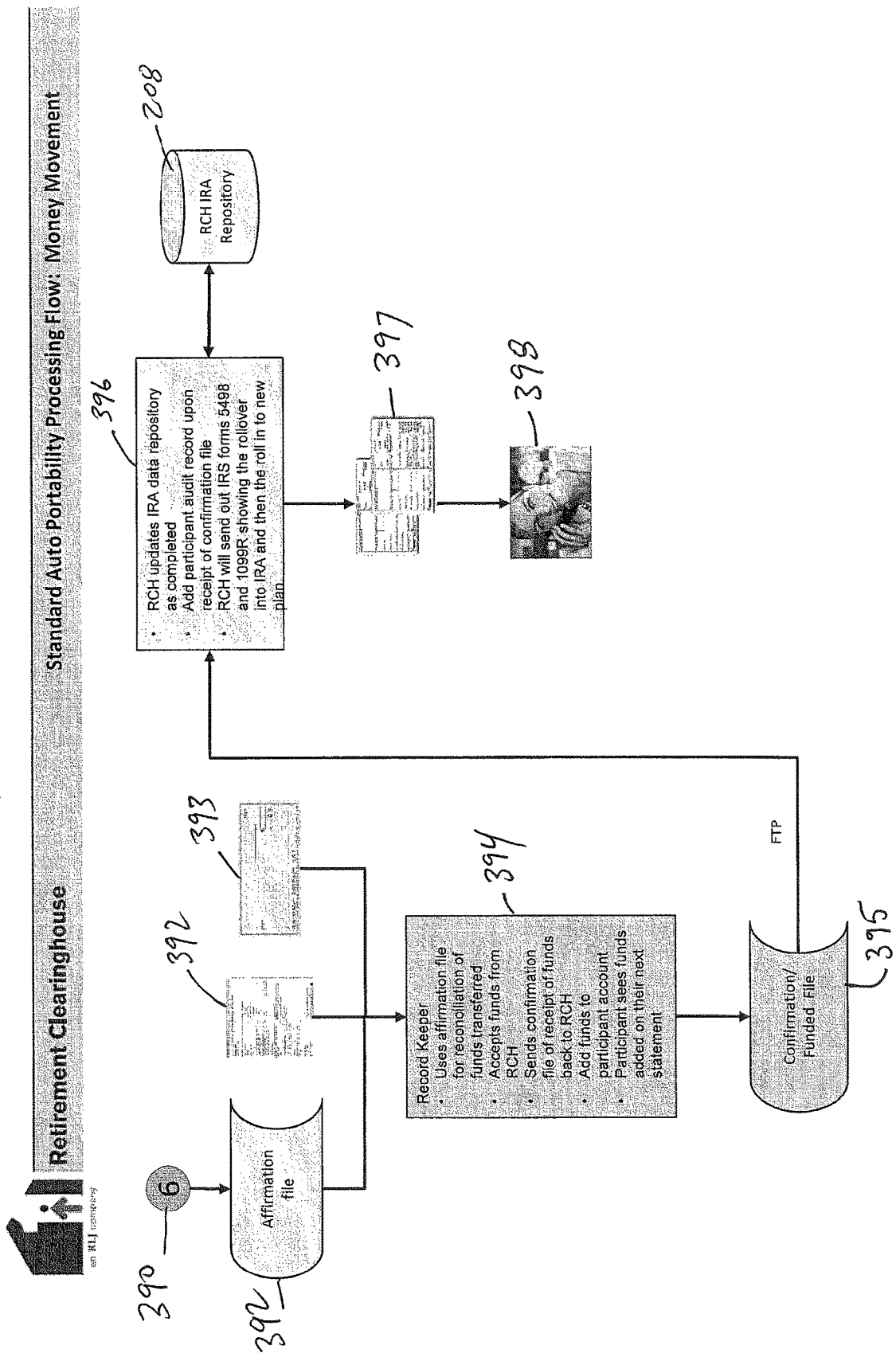
FIG. 13 is a flowchart showing preferred aspects of money movement in a preferred PAPIRAS of the present disclosure incorporating a negative consent notification.

As shown in FIG. 13, at 390 the affirmation file 392 along with the funds 393 are sent to the record-keeper. At 394, the record-keeper uses the affirmation file for the reconciliation of funds transferred, accepts the funds from RCH 112, sends a confirmation file of receipt of the funds back to RCH 112, adds the funds to the participants' respective matching accounts, whereby participants see the funds added on their next account statement. At 395, the confirmation file receipts are transferred, typically by file transfer protocol, to RCH 112 at 396 wherein RCH 112 updates IRA repository database 208, updates participant audit trail record upon receipt of confirmation file, and sends out IRS forms 5498 and 1099 showing the rollover into the IRA and then the roll-over into the new plan account. If an owner/participant has any questions about the forms 397, they can call RCH 112 as at 398.

Data-Only Auto Portability

Figure 14:
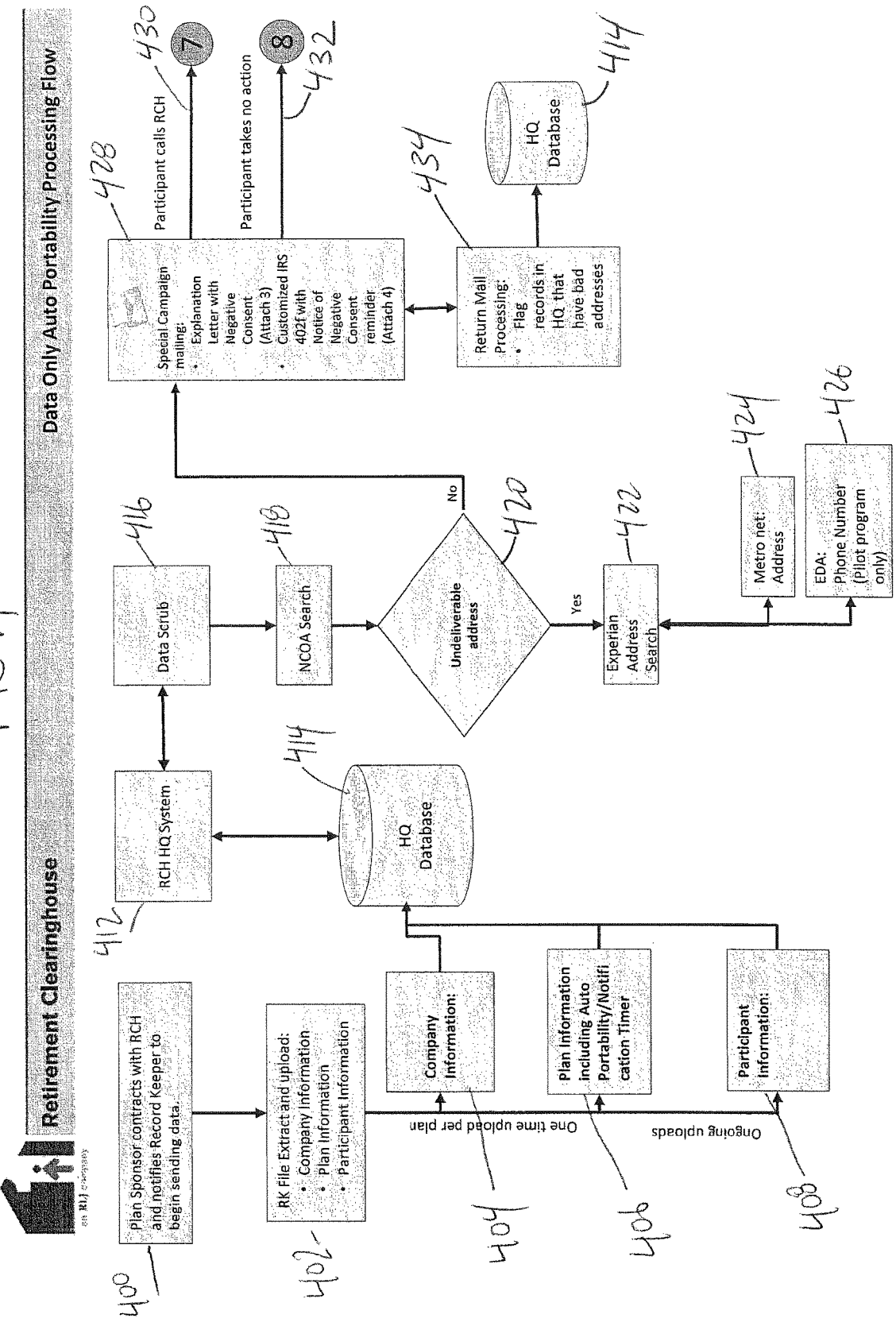
FIG. 14 is a flowchart showing an overview of various aspects of a Data Only Auto Portability Processing Flow in a preferred PAPIRAS of the present disclosure incorporating a negative consent notification.

Another preferred computer implemented method of the present disclosure, carried out over one or more networks, for the proactive, without initiation by an owner of a first retirement account, and automatic portability of the first retirement account is shown in FIG. 14 in block diagram form and designated generally by the reference numeral 400. In this preferred embodiment, designated as a "data only auto portability" system/method where a record-keeper has not predetermined that it will, using a "negative consent notification" automatically consolidate another retirement account owned by the participant with the first retirement account held by the record-keeper, but may decide to do so upon finding such other matching retirement account, subject to any other instructions received by the participant/owner of the accounts. In this case, the other retirement account may also be maintained by the record-keeper or another record-keeper. Additionally, the consolidation may flow either way where the first retirement account is rolled into the other retirement account or vice versa, depending upon the type of retirement accounts involved.

At 401, a plan sponsor contracts with Retirement Clearing House (RCH) 412 and notifies a record-keeper, which is a member of RCH 412 or otherwise has a contractual relationship with RCH 412, to send data regarding individual retirement accounts.

At 402, the record-keeper's file is extracted and uploaded. Such file typically contains company information for the record-keeper, plan information for the retirement plan and participant information for the participants in the retirement plan. Company information 404, plan information including particulars on auto portability and notification timers 406, and participant information 408 are stored in the RCH database 414 which is accessed by the RCH main system 412.

At 416, RCH 412 performs a data scrub on the participant information by examining these records for completeness and seeks to rehabilitate any records not in compliance with applicable rules and regulations. For instance, at 418, RCH 412 may transmit data to the National Change Of Address service to verify an owner's/participant's address.

If it is determined at 420 that an undeliverable address exists for a given participant, further searching or verification services may be employed such as Experian phone and address search at 422, metro net address verification at 424 or EDA phone number verification at 426.

For each verified address at 420, at 428, notification letters are sent to each plan participant by RCH system 412 which explain the role of RCH 412 and setting forth that if the owner/participant does not opt-out of the automatic roll-in program within a certain time period (generally 60 days), RCH 412 will begin to periodically check for records of 401(k) and 403(b) providers to locate and match your account information to an eligible retirement account; and that if such a match is found, RCH 412 will close your current account and consolidate your savings to the eligible retirement account for a one-time fee and that the participant will receive notification when such transaction is complete. The notice also states that the account owner/participant may opt-out of such automatic roll-in program by contacting the RCH 412. Also included is an IRS 402(*f*) notice. At 434, all notifications returned as being addressed to an undeliverable address will be flagged in the database 414 as having a bad address. If no contact is received from participants having unverified or undeliverable addresses, further lost and missing participant searches may be done.

As shown in FIG. 15, if participant contacts RCH 412 as at 430, the CRM application 436 linked to the RCH database 414 will verify participant's data such as name address, Social Security number, etc., and process any opt-outs from the auto portability program as at 438.

If the participant or owner of the retirement account does opt-out of the auto portability program, a flag to indicate the same on participant's record in the database 414 is set. If the participant does not opt-out, RCH 412 goes no further at this point to process any cash out or rollover request the participant may have, but would notify the record-keeper or plan administrator of any such instructions.

As shown in FIG. 16, at 432 where participant takes no action in response to the notification mailed at 428 and RCH 412 timer expires at 450, database 414 is updated with such information and at 452 the non-responder participant records are moved to data repository 454 to be used in a further locate and match process. The records of the participants who have opted-out are not moved to such data repository database 454.

FIG. 17 illustrates the periodic searching performed by RCH 412 with respect to retirement accounts it has on file or received from record-keepers. At 456-458, RCH 412 selects data files for retirement accounts to be sent to record-keepers for the purpose of locating and matching existing eligible retirement accounts owned by the same participant(s). Opt-out records are not included. Such data files are selected from the IRA repository database 454. The data in search file 460 is again scrubbed as at 462-470 as discussed above. At 472-476, the scrubbed data file is transferred to one or more record-keepers that have contracted with or are members of RCH 412 for the purposes of locating and matching retirement accounts within their respective records, as at 478. At 480-482, each account is flagged as either being matched (482) or not matched (484) with the data file and its audit trail being updated at 486.

At 488 as shown in FIG. 18, each updated data file for each participant retirement account 490 is received by RCH 412 at 492. At 494, if there is no match, an audit trail record is created or updated showing the same on participant's account at 500. If a match does exist, at 496 the record for the account is flagged in the IRA repository 414 to move the account to the CRM system at 502. At 498, RCH 412 preferably creates a safe harbor file for all matched records to create a conduit IRA for effecting any roll-ins or account consolidations through RCH 412 to avoid cumbersome trustee to trustee transfers which are very difficult to complete due to the restrictive requirements therefor.

At 504, CRM application 502 of RCH 412 contacts the receiving record-keeper to request any required roll-in forms. At 506, the record-keeper provides any required roll-informs and as shown at 508, if a wet signature is required on the roll-in form, CRM application 502 sends forms 512 to the owner/participant for such signatures as at 510. If the participant has questions, he or she may call the CRM application 502 as at 520. If a wet signature is not needed, at 516 a notification 518 is sent to the participant of the matching account found and/or of the pending or completed roll-in of the retirement account, such as a SHIRA, into the found eligible account.

As shown in FIG. 19, at 498 RCH 412 at 530 creates distribution records for all found participants and such distribution records are stored in data repository 414 and also forwarded to the IRA repository database 544. Such distribution records are placed in distribution file at 532 and transferred at 534 to the record-keeper indicating how the funds are to be distributed to the owners/participants. At 536 the funds are sent to a custodial lockbox 538 either by separate checks or wire transfer. The latter of which requires a detailed breakdown file to be uploaded to RCH 412 prior to the wire transfer taking place. At 542, a batch file of participant data of funded files is sent to the IRS for verification under the IRS TIN matching program. If a participant account fails it is further flagged for possible Patriot Act processing. The IRA System 546 of RCH 412 receives the information from the IRA database 544. At 548, RCH 412 does a search of internal RCH 412 records for other retirement accounts own by each owner/participant. Where a match is found for a participant, the funds from the account that was used in the search are rolled into such an RCH IRA also owned by the participant. Those combined funds can then be rolled into the account owner's active account that was located in the search. Where no match is found at 550, RCH 412 opens a new conduit IRA account for such participant.

At 552, RCH 412 matches funding for each IRA and activates each IRA. At 554, the funds are posted to each conduit IRA or existing IRA, as the case may be. At 556, RCH 412 sends a letter 560 to each participant to notify them that funds have been received into an RCH conduit IRA or existing IRA on their behalf, as the case may be. The notification further indicates that such RCH conduit IRA or existing IRA of the owner's is in the process of being rolled into the owner's currently active retirement account with owner's current employer's plan and that RCH will notify the owner when such transaction is completed. If the owner has questions, he or she may call the RCH 412 as at 558.

As illustrated in FIG. 20, at 522 RCH 412 will create a distribution record to liquidate conduit IRAs for each participant upon receipt of any required forms from participant at 570 and the audit trail for each account data file will be updated to show the same. At 572, the IRA distribution records will be stored in the RCH IRA database 544 while distribution file 574 goes through a scrubbing or verification process at 576-586. At 578, upon passing Patriot Act verification, the distribution file is liquidated at 588 with the funds being transferred to a custodial bank account 589. At 590 RCH 412 will send affirmation records with amount of funds to be transferred to the record-keeper and will transfer those funds with complete roll-in documentation.

As shown in FIG. 21, at 592 the affirmation file 594-596 along with the funds 598 are sent to the record-keeper. At 600, the record-keeper uses the affirmation file for reconciliation of funds transferred, accepts the funds from RCH 412, sends a confirmation file for receipt of the funds back to RCH 412, and adds the funds to the participant's matching account, whereby participant sees the funds added on their next account statement. At 602, the confirmation file receipts are transferred, typically by file transfer protocol, to RCH 412 at 604 wherein RCH 412 updates IRA repository database 544, adds participant audit trail record upon receipt of confirmation file, and sends out IRS forms 5498 and 1099 to participant showing the rollover into RCH IRA and then the roll-over into the new plan. If a participant has any questions about the forms 606, they can call RCH 412 as at 608.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer system for identifying, locating, matching, and tracking retirement accounts, comprising:
   the computer system configured to repeatedly receive from account record keepers over a computer network electronic data records associated with retirement accounts owned by owners;
   a database server configured to format, standardize, and store the received electronic data records in a central database repository where all electronic data records received from account record keepers are stored;
   a data packet created by the computer system using the information in the received electronic data records that is assigned to an identified retirement account owner;
   the computer system creates a unique and exclusive identification term for the data packet named a PMID;
   the computer system sends the PMID data packet to account record keepers over a computer network through a file transfer protocol in search of additional information about the identified owner;
   the computer system updates the PMID data packet when additional information about the identified owner is obtained from one or more of the account record keepers;
   the computer system repeatedly resends the PMID data packet over a computer network to account record keepers through a file transfer protocol if the computer system determines that the PMID data packet does not yet contain sufficient information to conclude that the identified owner owns two or more retirement accounts;
   the computer system determines when the PMID data packet no longer needs to be sent to account record keepers because it contains sufficient information to conclude that the identified owner owns two or more retirement accounts; and
   the PMID data packet enters an audit trail phase where new information about the identified owner is added to the PMID data packet that determines an action to be taken with respect to the associated two or more retirement accounts for the identified owner.

2. The computer system of claim 1, wherein the new information is instructions from the identified owner about actions to take on a retirement account.

3. The computer system of claim 1, wherein the new information is instructions from the identified owner to consolidate retirement accounts when the computer system learns that the owner has opened a new retirement account after the PMID data packet has entered the audit trail phase.

4. The computer system of claim 3, where the action to be taken is the consolidation of retirement accounts.

5. The computer system of claim 1, wherein the new information is instructions from the identified owner to contact the owner when the computer system learns that the owner has opened a new retirement account after the PMID data packet has entered the audit trail phase.

6. The computer system of claim 5, where the computer system generates a correspondence intended to notify the identified owner that the computer system has identified the new retirement account.

7. The computer system of claim 1, wherein the new information is instructions from the identified owner to take no action when the computer system learns that the owner has opened a new retirement account after the PMID data packet has entered the audit trail phase.

8. The computer system of claim 7, where the computer system takes no action on the new retirement account.

9. The computer system of claim 1, wherein the computer system repeatedly obtains updated information from the two or more retirement accounts, the identified owner, or a new retirement account during the audit trail phase and uses updated information to find other accounts owned by the identified owner.

10. The computer system of claim 9, where the computer system generates a correspondence intended to inform the identified owner about any other accounts owned by the identified owner.

11. The computer system of claim 1, wherein the computer system repeatedly obtains updated information from the two or more retirement accounts, the identified owner, or a new retirement account during the audit trail phase and uses updated information to autofill electronic forms for the identified owner.

* * * * *